(12) United States Patent
Kobayashi et al.

(10) Patent No.: US 6,361,399 B2
(45) Date of Patent: Mar. 26, 2002

(54) SLIDER PROCESSING APPARATUS, LOAD APPLYING APPARATUS AND AUXILIARY DEVICE FOR PROCESSING SLIDER

(75) Inventors: Kanji Kobayashi; Masao Yamaguchi, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/861,621

(22) Filed: May 22, 2001

Related U.S. Application Data

(62) Division of application No. 09/397,869, filed on Sep. 17, 1999.

(30) Foreign Application Priority Data

Sep. 25, 1998 (JP) ............................................. 10-272251
Sep. 25, 1998 (JP) ............................................. 10-272252
Sep. 25, 1998 (JP) ............................................. 10-272253
Sep. 25, 1998 (JP) ............................................. 10-272254

(51) Int. Cl.$^7$ .............................................. B24B 49/00
(52) U.S. Cl. ................ 451/5; 451/28; 451/41; 451/59; 451/168; 451/313; 451/314
(58) Field of Search ................. 451/28, 5, 41, 451/59, 168, 313, 314

(56) References Cited

U.S. PATENT DOCUMENTS

| 5,301,077 A | | 4/1994 | Yamaguchi et al. |
| 6,132,290 A | * | 10/2000 | Sugiyama et al. ............ 451/10 |
| 6,162,114 A | * | 12/2000 | Kobayashi et al. ............ 451/41 |

FOREIGN PATENT DOCUMENTS

| JP | A-2-301014 | 12/1990 |
| JP | A-6-12645 | 1/1994 |
| JP | A-6-282831 | 10/1994 |
| JP | A-11-238214 | 8/1999 |

* cited by examiner

Primary Examiner—Joseph J. Hail, III
Assistant Examiner—Shantese McDonald
(74) Attorney, Agent, or Firm—Oliff & Berridge PLC

(57) ABSTRACT

It is an object of the invention to prevent a lapping member from being cut by an edge of a slider when the edge is chamfered by lapping it with the lapping member.

A slider held by a slider holding jig according to the invention is put in contact with a diamond lapping sheet. A load applying portion moves weights provided in the form of a plurality of stages downward from a state in which the lower end of a shaft portion of the weight at the bottom stage is located above the slider holding jig without contacting the slider holding jig, thereby loading the slider holding jig with the weights sequentially from the bottom stage.

52 Claims, 25 Drawing Sheets

SLIDER PROCESSING APPARATUS, LOAD APPLYING APPARATUS AND AUXILIARY DEVICE FOR PROCESSING SLIDER

This is a Division of application Ser. No. 09/397,869 filed Sep. 17, 1999. The entire disclosure of the prior application(s) is hereby incorporated by reference herein in its entirety.

BACKGROUND OF THE INVENTION

1. Field of the Invention

The present invention relates to an apparatus and method for processing a slider, a load applying apparatus for processing a slider and an auxiliary device for processing a slider which are employed for chamfering edges of a slider used for a flying type magnetic head or the like.

2. Description of the Related Art

In general, a flying type magnetic head used in a magnetic disc drive or the like has a configuration in which a thin film magnetic head element is formed at the rear end of a slider. A slider generally has rail portions whose surfaces face a recording medium (air bearing surfaces) and has a taper or step portion in the vicinity of the end at the air inflow side such that the rail portions fly slightly above the surface of a recording medium such as a magnetic disc or the like because of a stream of air flowing in through the taper or step portion.

For example, as disclosed in Japanese unexamined patent publication (KOKAI) No. H6-282831, in order to prevent edges of a slider such as edges defined by the surfaces of the rail portions to face a recording medium and outer lateral walls of the rail portions from damaging the recording medium when the slider is inclined because of a shake or the like, a chamfering process is performed on the edges of the slider.

For example, as disclosed in Japanese unexamined patent publication (KOKAI) No. H6-12645, a method for chamfering on edges of a slider according to the related art is to put the surface of a slider to face a recording medium into contact with a diamond lapping sheet provided on an elastic element with a load applied thereto and to lap the slider by moving it relative to the diamond lapping sheet.

According to the above-described method for chamfering, a slider must be urged against the diamond lapping sheet by applying a load thereto. However, a problem has arisen in that the diamond lapping sheet can be cut by edges of a slider especially before the chamfering of the edges of the rail portions or at an early stage of the chamfering because the base material of the diamond lapping sheet is thin.

According to the above-described method for chamfering, it is further necessary during actual processing to urge a slider against the diamond lapping sheet by applying a load to a jig. On the contrary, the load must not be applied to the jig when the slider is attached to or removed from the processing apparatus. This necessitates a mechanism for applying the load to the jig only when needed.

A possible mechanism for this purpose is a mechanism having a weight with a shaft portion which can be put into contact with a jig at the lower end thereof and a large diameter portion greater in the diameter than the shaft portion and having a weight holding portion formed with a hole which allows the shaft portion of the weight to pass therethrough and which disallows the large-diameter portion to pass therethrough, for holding the weight movably in the axial direction of the shaft portion of the weight with the hole, the mechanism allowing the weight holding portion to be moved up and down.

However, such a mechanism has a problem in that the weight can not be smoothly moved relative to the weight holding portion because the shaft portion of the weight frequently rubs against the hole of the weight holding portion to generate chips (particles).

According to the above-described method for chamfering, the entire edges of a slider are substantially uniformly chamfered.

However, the above-described method for chamfering had a problem in that it does not allow a part of the edges of a slider, e.g., a region of the edges at the air inflow side of the slider, to be chamfered in a greater amount than in other regions of the edges even when it is desired.

A slider for a magnetic head is formed by cutting a wafer having a multiplicity of magnetic head elements formed in a matrix configuration in one direction to form blocks referred to as "bars" which include a plurality of magnetic head elements arranged in a row, forming rail portions on the bars and thereafter cutting the bars into each separate slider. Referring now to a slider as disclosed in Japanese unexamined patent publication (KOKAI) No. H6-282831, outer lateral walls of two rail portions serve as lateral walls of a slider as they are. However, the configuration as disclosed in Japanese patent publication (KOKAI) No. H6-282831 has a problem in that rail portions can be broken off (chipping) as a result of mechanical processing to cut bars into sliders.

For this reason, sliders as shown in FIG. 47 have become popular in which rail portions 213 are formed such that lateral walls 214 of the rail portions 213 are located inside lateral walls 212 of a slider 211 or cut portions of a bar with a predetermined distance therebetween. A slider having such a configuration will be hereinafter referred to as "a slider having a two-step structure".

In such a slider having a two-step structure, chamfering is also performed on edges of the rail portions. For example, as disclosed in Japanese unexamined patent publication No. H6-12645, a method for chamfering edges of rail portions according to the related art is to slide the slider on a diamond lapping sheet provided on an elastic element. FIG. 48 schematically illustrates the method for chamfering according to the related art. According to the method for chamfering of the related art, a plurality of sliders 211 are fixed to a jig 215 and are slid in two horizontal directions on a diamond lapping sheet 217 provided on a plate-like elastic member 216 formed from, for example, silicone rubber while urging them in the direction of the arrow indicated by a reference number 218 in the figure, thereby chamfering edges 219 of rail portions 213.

FIG. 49 is an enlarged view of the neighborhood of edges 219 of rail portions 213 (the region C in FIG. 48) which have been chamfered according to the method illustrated in FIG. 48.

As disclosed in Japanese unexamined patent publication (KOKAI) No. H2-301014, another method for chamfering according to the related art is to move a lapping tape back and forth under the guidance of a guide to thereby slide the lapping tape relative to rail portions of a slider.

There is a recent need for a reduction in the flying amount of a slider in order to improve the recording density. There is also a need for improved stability of the flying of a slider in order to increase access speed. Negative pressure sliders have recently come into use to satisfy such needs. In general, a negative pressure slider is formed with a projection for generating a negative pressure between the two rail portions thereof. In such a negative pressure slider, the surface toward a recording medium has a microscopic configuration and, especially, the height of the rail portions is significantly smaller than that in conventional sliders.

In such a negative pressure slider, as shown in FIG. 50, the small height of the rail portions has resulted in a problem in that a recording medium 225 can be put into contact with and damaged by an edge 224 defined by a lateral wall 222 of a slider 221 and a surface 223 of the slider toward the recording medium perpendicular thereto when the slider 221 is inclined. The above-described problem is significant especially in a hard disc device used in a portable apparatus such as a notebook type personal computer in which the slider is often inclined.

Under such circumstances, the inventors have proposed, for example in Japanese unexamined patent publication (KOKAI) No. H11-238214 and U.S. patent application Ser. No. 09/064,734, a technique for lapping and chamfering a plurality of edges having steps of a slider simultaneously by transforming a diamond lapping sheet using a wire. In this case, since processing accuracy is reduced if the tension of the wire is unstable, the tension of the wire must be made stable in order to improve processing accuracy.

OBJECTS AND SUMMARY OF THE INVENTION

It is a first object of the invention to provide an apparatus and method for processing a slider and a load applying apparatus for processing a slider which make it possible to prevent an edge of a slider from cutting a lapping member when the edge of the slider is lapped with the lapping member to chamfer the edge.

It is a second object of the invention to provide an apparatus for processing a slider and a load applying apparatus for processing a slider wherein a load can be applied to a slider holder for holding a slider only when needed during lapping on an edge of a slider to chamfer the edge and wherein the mechanism can operate smoothly.

It is a third object of the invention to provide an apparatus and method for processing a slider and auxiliary device for processing a slider which make it possible to chamfer a part of an edge of a slider in a greater amount than in other regions of the edge.

It is a fourth object of the invention to provide an apparatus and auxiliary device for processing a slider which make it possible to lap and chamfer a plurality of edges having steps of a slider simultaneously with improved processing accuracy.

A first slider processing apparatus according to the invention is an apparatus for lapping an edge of a slider having a surface to face a medium to chamfer the edge, comprising:

a slider holder for holding a slider;

a lapping member for lapping an edge of the slider held by the slider holder;

load applying means (apparatus) for applying a load to the slider holder so as to urge the slider held by the slider holder against the lapping member, capable of adjusting the load applied to the slider holder; and moving means (device) for moving the slider held by the slider holder and the lapping member relative to each other such that the edge of the slider is lapped by the lapping member.

In the first processing apparatus according to the invention, the load applying means (apparatus) applies a load to the slider holder so as to urge the slider held by the slider holder against the lapping member, and the load applied to the slider holder is adjusted.

For example, the lapping member of the first processing apparatus according to the invention is in the form of a sheet.

For example, the load applying means (apparatus) of the first processing apparatus according to the invention has a plurality of weights for applying a load to the slider holder and load adjusting means (device) for adjusting the load by applying the load originating from the plurality of weights to the slider holder in a stepwise manner. In this case, for example, the weights include a shaft portion and a large diameter portion greater in the diameter than the shaft portion. The load adjusting means (device) includes weight holding portions in the form of a plurality of stages each formed with a hole which allows the shaft portion of the weight to pass therethrough and disallows the large diameter portion to pass therethrough for holding the weight movably in the axial direction of the shaft portion with the hole and includes weight holding portion moving means for moving the weight holding portion up and down. The load adjusting means (device) moves the weight holding portions downward with the weight holding portion moving means from a position in which the lower end of the shaft portion of the weight held by the weight holding portion at the bottom stage is located above the slider holder without contacting the slider holder to load the slider holder with the weights held by the weight holding portions in the form of a plurality of stages sequentially from the bottom stage. The weights comprise one or more blocks having a predetermined weight.

In the first processing apparatus according to the invention, a spiral (helical) groove may be formed on at least either the outer circumferential surface of the shaft portions of the weights or the inner circumferential surface of the holes of the weight holding portions.

For example, the lapping member of the first processing apparatus according to the invention may have a lapping surface, and the processing apparatus may further have a positioning device for positioning the slider holder such that a slider is put into contact with the lapping member in a state in which the surface of the slider to face a medium is inclined relative to the lapping surface of the lapping member. In this case, for example, the slider may include a plurality of edges having steps; the lapping member may have flexibility; and the processing apparatus may further have transforming means (device) for transforming the lapping member such that the plurality of edges having steps of the slider are simultaneously lapped by the lapping member.

In the first processing apparatus according to the invention, the slider may include a plurality of edges having steps, and the lapping member may have flexibility. The processing apparatus may further have a transforming device for transforming the lapping member such that the plurality of edges having steps of the slider are simultaneously lapped by the lapping member, which has a main body provided in a position opposite to the slider held by the slider holder with the lapping member sandwiched therebetween and a wire wound around the outer circumference of the main body for transforming the lapping member. The transforming device may further have an elastic member or a projection provided under a part of the wire located on the top surface of the transforming device.

A first method for processing a slider according to the invention comprises the steps of:

chamfering an edge of a slider having a surface to face a medium by lapping the edge with a lapping member for lapping an edge of a slider with the slider and lapping member moved relative to each other while applying a load to a slider holder so as to urge the slider against the lapping member; and changing the load applied to the slider holder depending on the progress of chamfering.

In the first method for processing according to the invention, the lapping member is, for example, in the form of a sheet.

In the step of changing the load of the first method for processing according to the invention, the load applied to the slider holder may be increased in a stepwise manner depending on the progress of chamfering.

In the method for chamfering according to the invention, for example, the lapping member may have a lapping surface, and the step of chamfering may include the steps of putting the slider in contact with the lapping member with the surface of the slider to face a medium inclined relative to the lapping surface of the lapping member and lapping a predetermined edge of the slider with the lapping member while moving the slider and the lapping member relative to each other in a state in which the slider is in contact with the lapping member with the surface of the slider to face a medium inclined relative to the lapping surface of the lapping. In this case, for example, the slider may include a plurality of edges having steps; the lapping member may have flexibility; and the step of lapping may simultaneously lap the plurality of edges having steps of the slider with the lapping member by transforming the lapping member.

In the first method for processing according to the invention, for example, the lapping member may have a lapping surface; the step of chamfering may include a first lapping step for lapping a part of an edge of the slider in contact with the lapping member while moving the slider and the lapping member relative to each other in a state in which the slider is in contact with the lapping member with the surface of the slider to face a medium inclined relative to the lapping surface of the lapping member and a second lapping step for lapping a part of the edge of the slider in contact with the lapping member while moving the slider and the lapping member relative to each other in a state in which the slider is in contact with the lapping member with the surface of the slider to face a medium in parallel with the lapping surface of the lapping member.

In this case, for example, the slider may include a plurality of edges having steps; the lapping member may have flexibility; and the first lapping step may simultaneously lap the plurality of edges having steps of the slider with the lapping member by transforming the lapping member. The second lapping step may lap the plurality of edges having steps of the slider with the lapping member by transforming the lapping member. For example, the slider may include a plurality of edges having steps, and the first lapping step may include the steps of lapping the edges of the slider with the lapping member without transforming the lapping member and simultaneously lapping the plurality of edges having steps of the slider with the lapping member by transforming the lapping member having flexibility. The first lapping step may chamfer at least a part of an edge in contact with the lapping member into a slanting surface, and the second lapping step may chamfer the edge chamfered into a slanting surface at the first lapping step into a curved surface.

A first load applying apparatus for processing a slider according to the invention is an apparatus which is used for a slider processing apparatus for lapping an edge of a slider having a surface to face a medium to chamfer the edge, comprising a slider holder for holding a slider having a surface to face a medium, a lapping member for lapping an edge of the slider held by the slider holder and moving means (device) for moving the slider held by the slider holder and the lapping member relative to each other so as to lap the edge of the slider with the lapping member and which applies a load to the slider holder so as to urge the slider held by the slider holder against the lapping member.

The first load applying apparatus according to the invention comprises:

a plurality of weights for applying a load to a slider holder; and load adjusting means (device) for adjusting the load by applying the load originating from the plurality of weights to the slider holder in a stepwise manner.

The weights include a shaft portion and a large diameter portion which is greater in the diameter than the shaft portion.

The load adjusting means (device) includes weight holding portions in the form of a plurality of stages each formed with a hole which allows the shaft portion of the weight to pass therethrough and disallows the large diameter portion to pass therethrough for holding the weight movably in the axial direction of the shaft portion with the hole and includes weight holding portion moving means (device) for moving the weight holding portion up and down.

The load adjusting means (device) moves the weight holding portion downward with the weight holding portion moving means from a position in which the lower end of the shaft portion of the weight held by the weight holding portion at the bottom stage is located above the slider holder without contacting the slider holder to load the slider holder with the weights held by the weight holding portions in the form of a plurality of stages sequentially from the bottom stage.

In the first load applying apparatus according to the invention, the load adjusting means (device) applies a load originating from the plurality of weights to the slider holder in a stepwise manner to adjust the load applied to the slider holder.

The weights of the first load applying apparatus according to the invention are constituted by, for example, one or more blocks having a predetermined weight.

In the first load applying apparatus according to the invention, a spiral (helical) groove may be formed on at least either the outer circumferential surface the shaft portions of the weights or the inner circumferential surface of the holes of the weight holding portions.

A second slider processing apparatus according to the invention is an apparatus for lapping an edge of a slider having a surface to face a medium to chamfer the edge, comprising:

a slider holder for holding a slider;

a lapping member for lapping an edge of the slider held by the slider holder;

load applying means (apparatus) for applying a load to the slider holder so as to urge the slider held by the slider holder against the lapping member; and moving means (device) for moving the slider held by the slider holder and the lapping member relative to each other such that the edge of the slider is lapped by the lapping member.

The load applying means (apparatus) has:

a weight including a shaft portion which can be put into contact with the slider holder at the lower end thereof and a large diameter portion greater in the diameter than the shaft portion;

a weight holding portion formed with a hole which allows the shaft portion of the weight to pass therethrough and which disallows the large-diameter portion to pass therethrough for holding the weight movably in the axial direction of the shaft portion of the weight with the hole; and weight holing portion moving means (device) for moving the weight holding portion up and down.

A spiral groove is formed on at least either the outer circumferential surface of the shaft portion of the weight or the inner circumferential surface of the hole of the weight holding portion.

In the second slider processing apparatus according to the invention, the weight holding portion can be moved up and down with the weight holding portion moving means (device) to select a state in which the lower end of the shaft portion of the weight does not contact with the slider holder and no load is therefore applied by the weight to the slider holder or a state in which the lower end of the shaft portion of the weight contacts the slider holder to apply a load originating from the weight to the slider. In this slider processing apparatus, chips (particles) generated by friction between the shaft portion of the weight and the hole of the weight holding portion are collected by the spiral groove formed on at least either the outer circumferential surface of the shaft portion of the weight or the inner circumferential surface of the hole of the weight holding portion to maintain a smooth operation of the shaft portion.

In the second slider processing apparatus according to the invention, for example, a plurality of the weight holding portions may be provided in the form of stages to hold a plurality of weights, and the load applying means (apparatus) may move the weight holding portions downward with the weight holding portion moving means (device) from a state in which the lower end of the weight held by the weight holding portion at the bottom stage is located above the slider holder without contacting the slider holder to load the slider holder with the weights held by the weight holding portions in the form of a plurality of stages sequentially from the bottom stage.

For example, the weights of the second slider processing apparatus according to the invention comprise one or more blocks having a predetermined weight.

Similarly to the first load applying apparatus, a second load applying apparatus for processing a slider is an apparatus for applying a load to a slider holder so as to urge a slider held by the slider holder against a lapping member, comprising:

a weight including a shaft portion which can be put into contact with the slider holder at the lower end thereof and a large diameter portion greater in the diameter than the shaft portion;

a weight holding portion formed with a hole which allows the shaft portion of the weight to pass therethrough and which disallows the large-diameter portion to pass therethrough, for holding the weight movably in the axial direction of the shaft portion of the weight with the hole; and weight holing portion moving means (device) for moving the weight holding portion up and down.

A spiral groove is formed on at least either the outer circumferential surface of the shaft portion of the weight or the inner circumferential surface of the hole of the weight holding portion.

Like the second processing apparatus according to the invention, in this second load applying apparatus, chips (particles) generated by friction between the shaft portion of the weight and the hole of the weight holding portion are collected by the spiral groove formed on at least either the outer circumferential surface of the shaft portion of the weight or the inner circumferential surface of the hole of the weight holding portion to maintain a smooth operation of the shaft portion.

For example, the weight of the second load applying apparatus according to the invention comprises one or more blocks having a predetermined weight.

A third slider processing apparatus according to the invention is an apparatus for lapping edges of a slider having a surface to face a medium to chamfer the edges, comprising:

a slider holder for holding a slider;

a lapping member having a lapping surface for lapping an edge of the slider held by the slider holder;

a positioning device for positioning the slider holder such that the slider contacts the lapping member with a surface of the slider to face a medium inclined relative to the lapping surface of the lapping member; and moving means (device) for moving the slider held by the slider holder and the lapping member relative to each other such that the edge of the slider is lapped by the lapping member.

In the third processing apparatus according to the invention, the slider holder is positioned by the positioning device such that the slider contacts the lapping member with a surface of the slider to face a medium inclined relative to the lapping surface of the lapping member.

In the third processing apparatus, for example, the slider may include a plurality of edges having steps, and the lapping member may have flexibility. The processing apparatus may further have transforming means (device) for transforming the lapping member such that the plurality of edges having steps of the slider are simultaneously lapped by the lapping member.

A second method for processing a slider according to the invention is a method for lapping an edge of a slider having a surface to face a medium to chamfer the edge, including the steps of:

putting a slider in contact with a lapping member with a surface of the slider to face a medium inclined relative to a lapping surface of the lapping member for lapping an edge of the slider; and moving the slider and the lapping member relative to each other in a state in which the slider is in contact with the lapping member with the surface of the slider to face a medium inclined relative to the lapping surface of the lapping member to lap a predetermined edge of the slider with the lapping member.

In the second processing method according to the invention, for example, the slider may include a plurality of edges having steps, and the lapping member may have flexibility. The lapping step may simultaneously lap a plurality of edges having steps of a slider by transforming the lapping member.

A third method for processing a slider according to the invention is a method for lapping an edge of a slider having a surface to face a medium to chamfer the edge, including:

a first lapping step for lapping a part of an edge of a slider in contact a the lapping member while moving the slider and the lapping member relative to each other in a state in which the slider is in contact with the lapping member with a surface of the slider to face a medium inclined relative to a lapping surface of the lapping member; and a second lapping step for lapping a part of an edge of the slider in contact with the lapping member while moving the slider and the lapping member relative to each other in a state in which the slider is in contact with the lapping member with the surface of the slider to face a medium in parallel with the lapping surface of the lapping member.

In the third method for processing according to the invention, for example, the slider may include a plurality of edges having steps; the lapping member may have flexibility; and the first lapping step may simultaneously lap the plurality of edges having steps of the slider with the lapping member by transforming the lapping member. The second lapping step may lap the plurality of edges having steps of the slider with the lapping member by transforming the lapping member. For example, the slider may include a plurality of edges having steps, and the first lapping step may include the steps of lapping the edges of the slider with the lapping member without transforming the lapping member and simultaneously lapping the plurality of edges having steps of the slider with the lapping member by transforming the lapping member having flexibility. The first lapping step may chamfer at least a part of an edge in contact with the lapping member into a slanting surface, and the second lapping step may chamfer the edge chamfered into a slanting surface at the first lapping step into a curved surface.

A first auxiliary device for processing a slider according to the invention is a device for positioning a slider holder relative to a lapping member, which is used in a slider processing apparatus having a slider holder, lapping member and moving means, for lapping an edge of a slider to chamfer the edge.

The first auxiliary device according to the invention comprises:

a main body located above the lapping member; and a positioning portion formed on the main body for positioning the slider holder such that a slider is put into contact with the lapping member with a surface of the slider to face a medium inclined relative to the lapping surface of the lapping member.

With the first auxiliary device according to the invention, the slider holder is positioned by the positioning portion such that a slider is put into contact with the lapping member with a surface of the slider to face a medium inclined relative to the lapping surface of the lapping member.

A fourth slider processing apparatus according to the invention is an apparatus for lapping edges of a slider including a plurality of edges having steps and a surface to face a medium to chamfer the edges, comprising:

a slider holder for holding a slider;

a flexible lapping member for lapping edges of the slider held by the slider holder;

a transforming device for transforming the lapping member such that the plurality of edges having steps of the slider are simultaneously lapped by the lapping member, having a main body located opposite to the slider held by the slider holder with the lapping member sandwiched therebetween and a wire wound around the outer circumference of the main body for transforming the lapping member; and moving means (device) for moving the slider held by the slider holder and the lapping member relative to each other such that the edges of the slider is lapped by the lapping member.

In the fourth slider processing apparatus according to the invention, the lapping member is transformed by the wire of the transforming device, and a plurality of edges having steps of a slider are simultaneously lapped by the lapping member. The tension of the wire is stable because it is wound around the outer circumference of the main body.

The transforming device of the fourth slider processing apparatus according to the invention may further have an elastic member or projection provided under a part of the wire located on the upper surface of the transforming device.

A second auxiliary device for processing a slider according to the invention is used in a slider processing apparatus having the slider holder, lapping member and moving means like the fourth processing apparatus, for lapping edges of a slider to chamfer the edges and comprises:

a main body located in a position opposite to a slider held by the slider holder with the lapping member sandwiched therebetween; and a wire wound around the outer circumference of the main body for transforming the lapping member such that a plurality of edges having steps of the slider are simultaneously lapped by the lapping member.

With the second auxiliary device according to the invention, the lapping member is transformed by the wire, and a plurality of edges having steps of a slider are simultaneously lapped by the transformed lapping member. The tension of the wire is stable because it is wound around the outer circumference of the main body.

The second auxiliary device according to the invention may further have an elastic member or projection provided under a part of the wire located on the upper surface of the auxiliary device for processing a slider.

Other objects, features and advantages of the invention will become clear enough from the following description.

DETAILED DESCRIPTION OF PREFERRED EMBODIMENT

A preferred embodiment of the invention will now be described with reference to the drawings.

Figure 1:
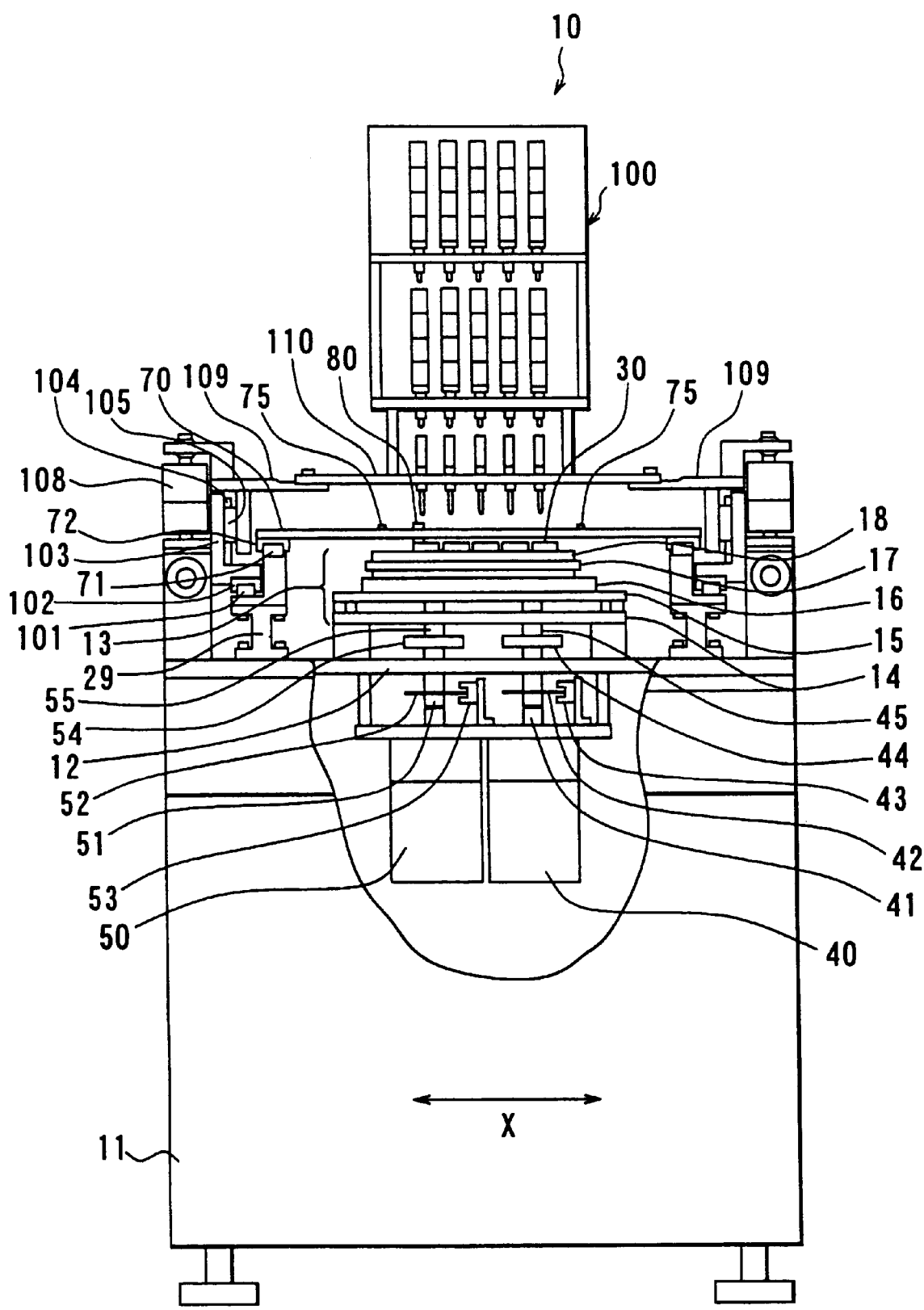
FIG. 1 is a partially cutaway front view of a slider processing apparatus according to an embodiment of the invention.
Figure 2:
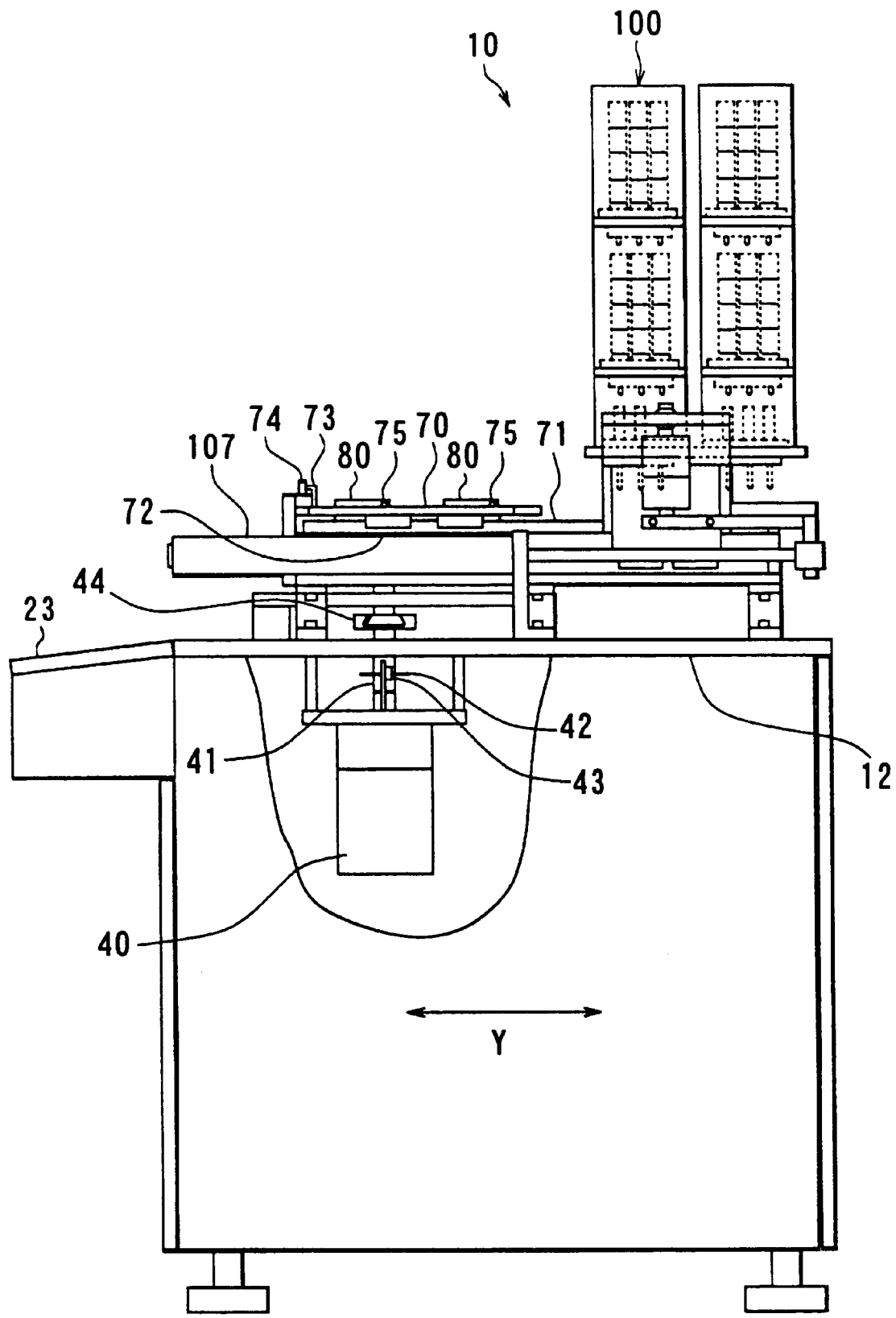
FIG. 2 is a right side view of the apparatus in FIG. 1.
Figure 3:
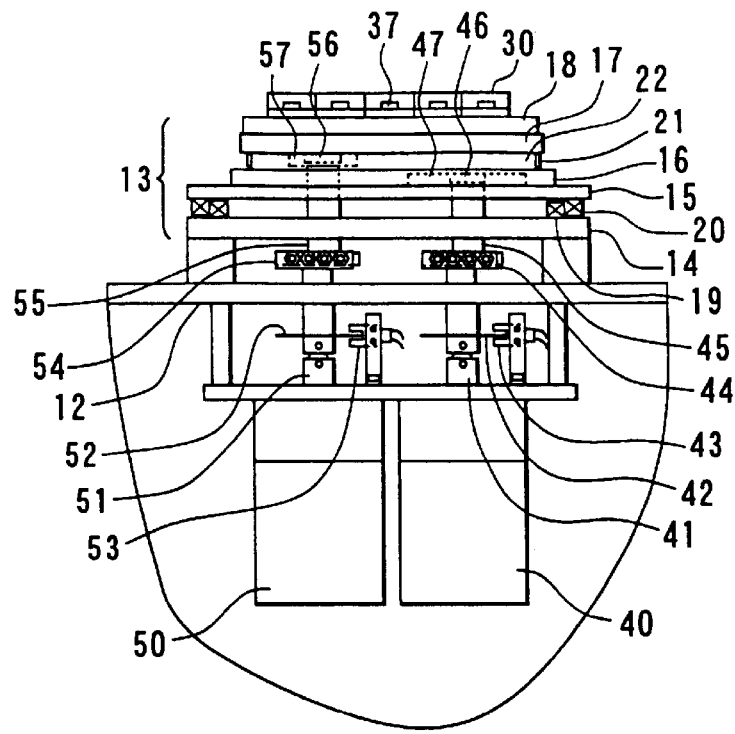
FIG. 3 is an enlarged front view of the apparatus in FIG. 1 showing the neighborhood of an X-Y table.
Figure 4:
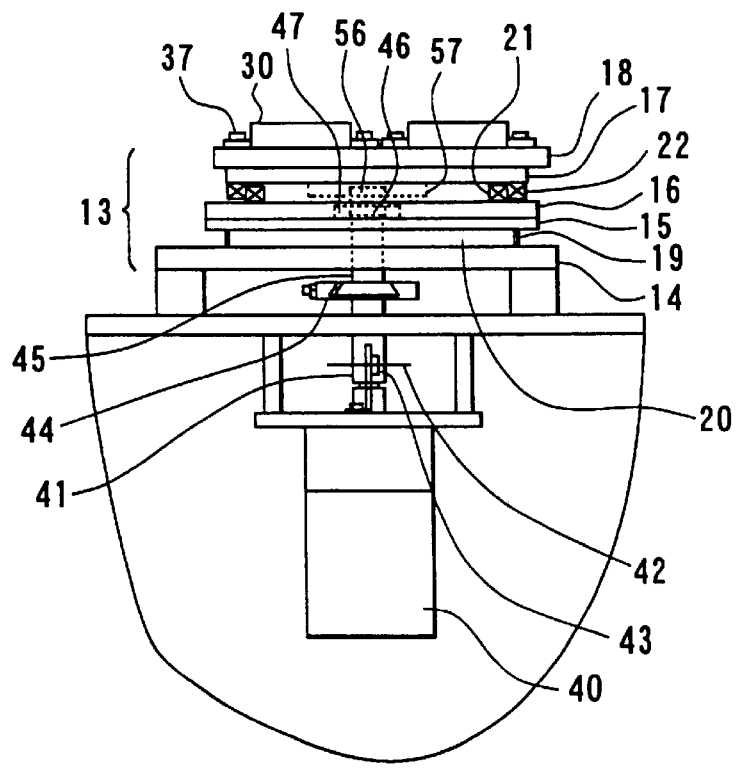
FIG. 4 is a right side view of the region shown in FIG. 3.

FIG. 1 is a partially cutaway front view of a slider processing apparatus according to an embodiment of the invention. FIG. 2 is a right side view of the apparatus shown in FIG. 1. FIG. 3 is an enlarged front view of the apparatus in FIG. 1 showing the neighborhood of an X-Y table. FIG. 4 is a right side view of the region shown in FIG. 3. A processing apparatus 10 according to the present embodiment is an apparatus for lapping an edge of a slider to chamfer the edge. The present embodiment will refer to an example of a slider used for a thin film magnetic head.

The processing apparatus 10 has an apparatus main body 11. An operation panel 23 is provided on the front end thereof. A base portion 12 is provided on the apparatus main body 11. There is provided an X-Y table 13 whose top surface can be moved in an X-direction (the horizontal direction indicated by the arrow in FIG. 1) and a Y-direction (the horizontal direction indicated by the arrow in FIG. 2) on the base portion 12. The X-Y table 13 corresponds to the moving means (device) according to the invention.

The X-Y table 13 has a fixed plate 14 fixed to the base portion 12, a Y-direction swinging plate 15 provided on the fixed plate 14, a plate 16 fixed on the Y-direction swinging plate 15, an X-direction swinging plate 17 provided on the plate 16 and a plate 18 provided on the X-direction swinging plate 17.

As shown in FIG. 3, guides 19 with a bearing extending in the Y-direction are provided at both ends of the top surface of the fixed plate 14 in the X-direction. Engaging portions 20 extending in the Y-direction in movable engagement with the guides 19 provided on the fixed plate 14 are provided on both ends of the bottom surface of the Y-direction swinging plate 15 in the X-direction. The Y-direction swinging plate 15 is moved in the Y-direction when the engaging portions 20 move along the guides 19 on the fixed plate 14.

As shown in FIG. 4, guides 21 with a bearing extending in the X-direction are provided at both ends of the top surface of the plate 16 in the Y-direction. Engaging portions 22 extending in the X-direction in engagement with the guides 21 provided on the plate 16 are provided on both ends of the bottom surface of the X-direction swinging plate 17 in the Y-direction. The X-direction swinging plate 17 is moved in the X-direction when the engaging portions 22 move along the guides 21 on the plate 16.

A plurality of wire winding blocks 30 are secured on the plate 18. The wire winding blocks 30 correspond to the transforming device or auxiliary device for processing a slider according to the invention. A configuration of the wire winding blocks 30 will be described later in detail.

As shown in FIG. 3, a Y-direction swinging motor 40 is provided in the apparatus main body 11. A disc 42 is attached to a rotating shaft 41 of the Y-direction swinging motor 40 in the apparatus main body 11. A swing origin sensor 43 is provided in the apparatus main body 11 such that it sandwiches the disc 42. For example, a hole is provided in a predetermined location of the disc 42, and a transmission type photo-sensor incorporating an amplifier is used as the swing origin sensor 43. In this case, the swing origin sensor 43 detects the position of the hole of the disc 42 to detect an origin of a swing in the Y-direction.

A rotating shaft 45 for a swing in the Y-direction is coupled to the upper end of the rotating shaft 41 of the Y-direction swinging motor 40 through a Y-direction swing width adjusting member 44 in a position higher than the top surface of the base portion 12. The Y-direction swing width adjusting member 44 is capable of offsetting the rotating shaft 41 of the Y-direction swinging motor 40 and the Y-direction swinging rotating shaft 45 and capable of adjusting the offset. A cam 46 having a bearing is attached to the upper end of the Y-direction swinging rotating shaft 45. A guide 47 extending in the X-direction for guiding the cam 46 is provided on the top surface of the Y-direction swinging plate 15. When the rotating shaft 41 of the Y-direction swinging motor 40 and the rotating shaft 45 for a swing in the Y-direction are offset, the cam 46 is rotating by a rotation of the Y-direction swinging motor 40, and a movement of the cam 46 along the guide 47 swings the guide 47, plate 16 and Y-direction swinging plate 15 in the Y-direction. The base portion 12, fixed plate 14, Y-direction swinging plate 15 and plate 16 are formed with a hole through which the Y-direction swinging rotating shaft 45 is inserted.

An X-direction swinging motor 50 is provided in the apparatus main body 11. A disc 52 is attached to a rotating shaft 51 of the Y-direction swinging motor 50 in the apparatus main body 11. A swing origin sensor 53 is provided in the apparatus main body 11 such that it sandwiches the disc 52. For example, a hole is provided in a predetermined location of the disc 52, and a transmission type photo-sensor incorporating an amplifier is used as the swing origin sensor 53. In this case, the swing origin sensor 53 detects the position of the hole of the disc 52 to detect an origin of a swing in the X-direction.

According to the present embodiment, the origins of swings in the Y- and X-directions are detected by the swing origin sensors 43 and 53 to return the position of the X-Y table 13 to an origin of swinging, which always keeps the position of X-Y table 13 constant when processing is started. This eliminates any variation of results of processing.

A rotating shaft 55 for a swing in the X-direction is coupled to the upper end of the rotating shaft 51 of the X-direction swinging motor 50 through an X-direction swing width adjusting member 54 in a position higher than the top surface of the base portion 12. The X-direction swing width adjusting member 54 is capable of offsetting the rotating shaft 51 of the X-direction swinging motor 50 and the X-direction swinging rotating shaft 55 and capable of adjusting the offset. A cam 56 having a bearing is attached to the upper end of the X-direction swinging rotating shaft 55. A guide 57 extending in the Y-direction for guiding the cam 56 is provided on the bottom surface of the X-direction swinging plate 17. When the rotating shaft 51 of the X-direction swinging motor 50 and the rotating shaft 55 for a swing in the X-direction are offset, the cam 56 is rotating by a rotation of the X-direction swinging motor 50, and a movement of the cam 56 along the guide 57 swings the guide 57, X-direction swinging plate 17 and plate 18 in the X-direction. The base portion 12, fixed plate 14, Y-direction swinging plate 15 and plate 16 are formed with a hole through which the X-direction swinging rotating shaft 55 is inserted.

Figure 5:
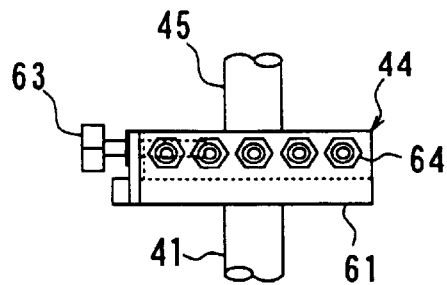
FIG. 5 is a front view of a Y-direction swing width adjusting member in FIG. 1.
Figure 6:
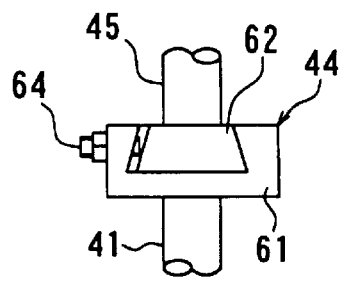
FIG. 6 is a side view of the member shown in FIG. 5.
Figure 7:
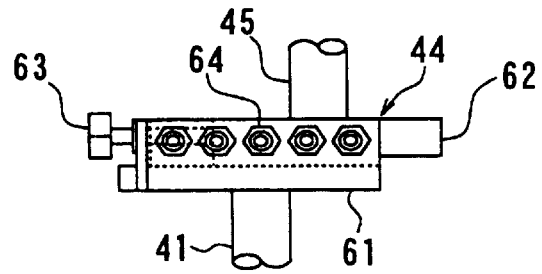
FIG. 7 is a front view of the Y-direction swing width adjusting member in FIG. 1.
Figure 8:
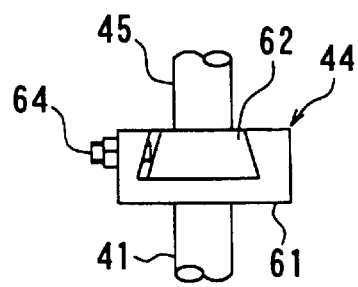
FIG. 8 is a side view of the member shown in FIG. 7.

A configuration and operation of the Y-direction swing width adjusting member 44 will now be described with reference to FIGS. 5 through 8. FIG. 5 is a front view of the Y-direction swing width adjusting member 44 taken when the offset between the rotating shaft 41 of the Y-direction swinging motor 40 and the Y-direction swinging rotating shaft 45 is zero, and FIG. 6 is a side view of the member shown in FIG. 5. FIG. 7 is a front view of the Y-direction swing width adjusting member 44 when the offset between the rotating shaft 41 of the Y-direction swinging motor 40 and the Y-direction swinging rotating shaft 45 is a predetermined quantity greater than zero, and FIG. 8 is a side view of the member shown in FIG. 7.

The Y-direction swing width adjusting member 44 is equipped with a fixed portion 61 fixed to the upper end of the rotating shaft 41 of the Y-direction swinging motor 40 and having a groove extending in one direction, a movable portion 62 movably contained in the groove of the fixed portion 61 and fixed to the lower end of the Y-direction swinging rotating shaft 45, a driving screw 63 attached to a side of the fixed portion 61 for moving the movable portion 62 relative to the fixed portion 61 and a fixing screw 64 attached to another side of the fixed portion 61 for fixing the movable portion 62 to the fixed portion 61.

With the Y-direction swing width adjusting member 44, the movable portion 62 can be moved relative to the fixed portion 61 by rotating the driving screw 63 and the movable portion 62 can be fixed to the fixed portion 61 by fastening the fixing screw 64.

When the Y-direction swinging motor 40 is driven with zero offset between the rotating shaft 41 of the Y-direction swinging motor 40 and the Y-direction swinging rotating shaft 45 as shown in FIGS. 5 and 6, the Y-direction swing width adjusting member 44 causes the Y-direction swinging rotating shaft 45 to only rotate and remain in the same position. Therefore, the resulting swing width of the Y-direction swinging plate 15 is zero.

When the Y-direction swinging motor 40 is driven with an offset of a predetermined quantity greater than zero between the rotating shaft 41 of the Y-direction swinging motor 40 and the Y-direction swinging rotating shaft 45 as shown in FIGS. 7 and 8, the Y-direction swing width adjusting member 44 causes the Y-direction swinging rotating shaft 45 to rotate eccentrically to the rotating shaft 41, which consequently causes the Y-direction swinging plate 15 to swing. In this case, the swing width of the Y-direction swinging plate 15 is twice the offset between the rotating shaft 41 and the Y-direction swinging rotating shaft 45.

The configuration and operation of the X-direction swing width adjusting member 54 are the same as those of the Y-direction swing width adjusting member 44.

In the present embodiment, the speed of rotation of the Y-direction swinging motor 40 is controlled within a range from 0 to 40 rpm, and the speed of rotation of the X-direction swinging motor 50 is controlled within a range from 0 to 30 rpm.

In the present embodiment, the swing width of the Y-direction swinging plate 15 is controlled within a range from 0 to 15 mm, and the swing width of the X-direction swinging plate 17 is controlled within a range from 0 to 30 mm.

As shown in FIG. 1, two rail portions 29 extending in the Y-direction are secured on the base portion 12 in positions on both sides of the X-Y table 13 in the horizontal direction thereof. A guide 71 extending in the Y-direction is provided on each of the rail portions 29.

A slider holding jig setting plate 70 is provided above the X-Y table 13. The slider holding jig setting plate 70 is provided to position a slider holding jig 80 for holding a slider. The slider holding setting plate 70 corresponds to the positioning device or auxiliary device for processing a slider according to the invention. The slider holding jig 80 corresponds to the slider holder according to the invention. Engaging portions 72 to engage the guides 71 are provided on the bottom surface of the slider holding jig setting plate 70 in the vicinity of both ends thereof in the X-direction. A movement of the engaging portions 72 along the guides 71 causes the slider holding jig setting plate 70 to move in the Y-direction. The slider holding jig setting plate 70 is located in a position above the X-Y table 13 when it is moved forward to the extremity and is retracted from the position above the X-Y table 13 by moving it backward from that state.

Figure 9:
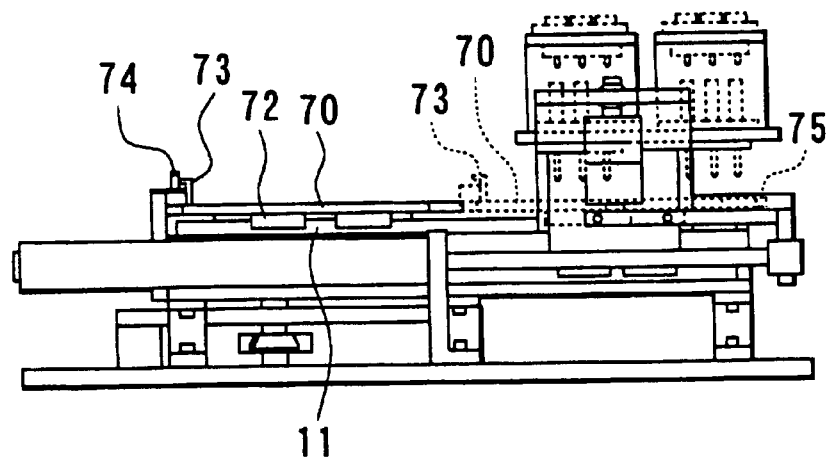
FIG. 9 illustrates a movement of a slider holding jig setting plate in FIG. 2.

FIG. 9 illustrates a movement of the slider holding jig setting plate 70. A stopper 75 is provided in a position that corresponds to the rear end of the slider holding jig setting plate 70 when the slider holding jig setting plate 70 is located at the backward extremity (right side in FIG. 9) to regulate the backward movement of the slider holding jig setting plate 70.

Figure 10:
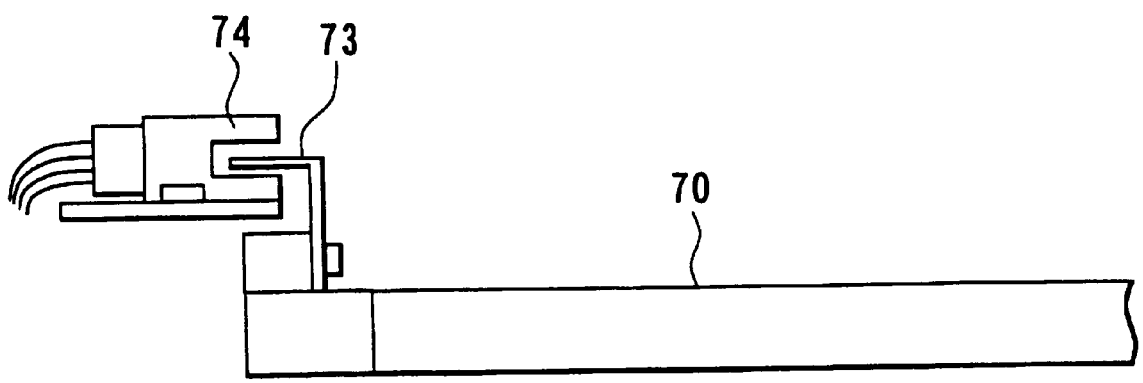
FIG. 10 illustrates a sensor for detecting the presence or absence of the slider holding jig setting plate shown in FIG. 9.

FIG. 10 illustrates a sensor for detecting the presence or absence of the slider holding jig setting plate 70 in the position above the X-Y table 13. As shown in FIG. 10, a sensor actuation piece 73 is provided at the forward end of the holding jig setting plate 70. In a position that corresponds to the forward end of the slider holding jig setting plate 70 when the slider holding jig setting plate 70 is located at the forward extremity, there is provided a slider holding jig setting plate detection sensor 74 for detecting the presence or absence of the sensor actuation piece 73 to detect the presence or absence of the slider holding jig setting plate 70 in the position above the X-Y table 13. For example, a transmission type photo-sensor incorporating an amplifier is used as the sensor 74.

According to the present embodiment, processing can not be carried out until the slider holding jig setting plate detection sensor 74 detects that the slider holding jig setting plate 70 has been retracted from the position above the X-Y table 13 and it is detected that the slider holding jig setting plate 70 has been thereafter located in the position above the X-Y table 13. The purpose is to retract the slider holding jig setting plate 70 from the position above the X-Y table 13 temporarily each time one cycle of processing is carried out to allow replacement of a diamond lapping sheet to be described later.

As shown in FIG. 1, a slider holding jig detection sensor 75 is provided on the slider holding jig setting plate 70 to detect whether the slider holding jig 80 is mounted on the slider holding jig setting plate 70 or not. For example, the sensor 75 is a photo-sensor having a light emitting portion and a light receiving portion provided in positions opposite to each other with the slider holding jig 80 interposed therebetween.

In the processing apparatus 10 of the present embodiment, the position of the X-Y table 13 is returned to the origin of swinging after the absence of the slider holding jig 80 is confirmed by the slider holding jig detection sensor 75.

The processing apparatus 10 of the present embodiment is further equipped with a load applying portion 100 for applying a downward load to a slider held by the slider holding jig 80, capable of adjusting the magnitude of the applied load. The load applying portion 100 corresponds to the load applying means (device) according to the invention. A configuration of the load applying portion 100 will be described in detail later.

Figure 11:
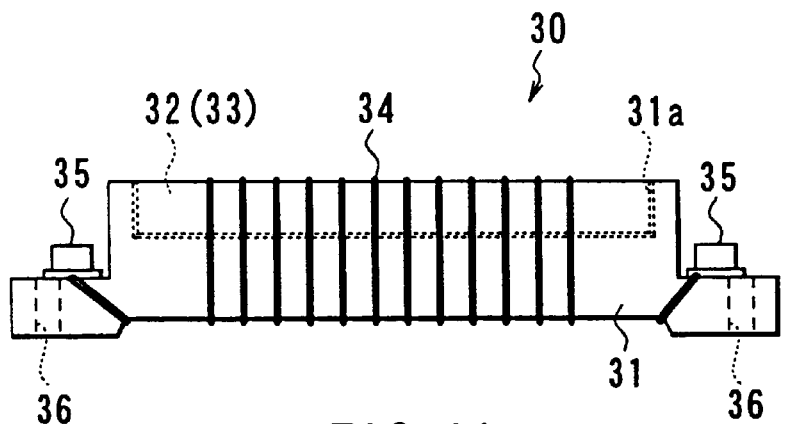
FIG. 11 is a side view of a wire winding block in FIG.
Figure 12:
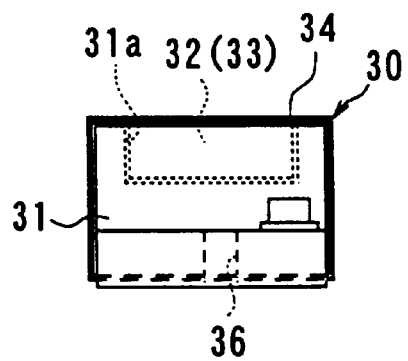
FIG. 12 is a front view of the wire winding block in FIG. 1.
Figure 13:
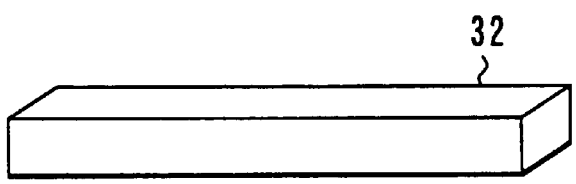
FIG. 13 is a perspective view showing an elastic member used in the wire winding block shown in FIG. 11.
Figure 14:
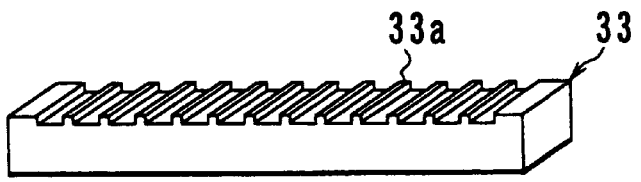
FIG. 14 is a perspective view showing a transforming member used for the wire winding block shown in FIG. 11.

A configuration of the wire winding block 30 will now be described with reference to FIGS. 11 through 15. FIG. 11 is a side view of the wire winding block 30. FIG. 12 is a front view of the wire winding block 30. FIG. 13 is a perspective view showing an elastic member used in the wire winding block 30. FIG. 14 is a perspective view showing a transforming member used for the wire winding block 30.

As shown in FIGS. 11 and 12, the wire winding block 30 has a block main body 31. The block main body 31 is formed with a rectangular recess 31a which is open on the top surface thereof. The recess 31a is adapted to contain a rectangular elastic member 32 as shown in FIG. 13 or a transforming member 33 as shown in FIG. 14. For example, the elastic member 32 is formed of silicone rubber. The top surface of the elastic member 32 is flush with the top surface of the block main body 31 when contained in the recess 31a. On the top surface of the transforming member 33, there is formed a plurality of projections 33a extending in a direction perpendicular to the longitudinal direction of the transforming member 33. Each of the projections 33a has a rectangular sectional configuration. For example, the transforming member 33 is formed of stainless steel. The top surface of the projections 33a is flush with the top surface of the block main body 31 when the transforming member 33 is contained in the recess 31a.

A wire 34 is wound in a plurality of turns around the outer circumference of the block main body 31 containing the elastic member 32 or transforming member 33 in the recess 31a thereof. The ends of the wire 34 are secured to the block main body 31 with wire locking screws 35 in the vicinity of both ends of the block main body 31 in the longitudinal direction thereof. When the transforming member 33 is contained in the recess 31a, a part of the wire 34 located on the upper surface of the wire winding block 30 is located above the projections 33a of the transforming member 33.

Holes 36 for inserting the locking screws are formed in the vicinity of both ends of the block main body 31 in the longitudinal direction thereof. As shown in FIGS. 3 and 4, the wire winding blocks 30 are secured to the plate 18 with locking screws 37 inserted through the holes 36 for the locking screws.

Figure 15:
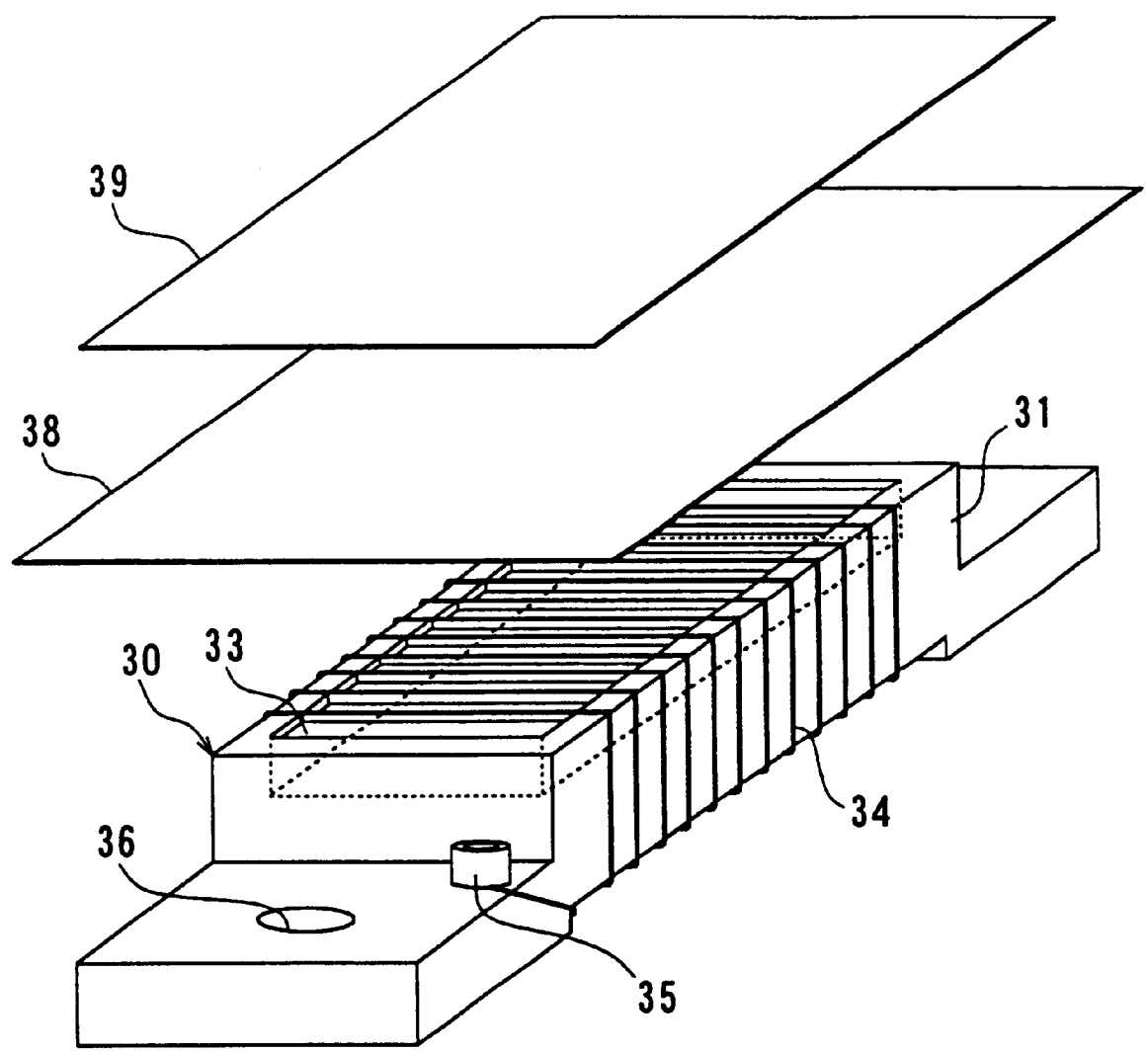
FIG. 15 is a perspective view showing the wire winding block shown in FIG. 11 and a rubber sheet and a diamond lapping sheet provided thereon.

FIG. 15 is a perspective view showing a wire winding block 30 and a rubber sheet and a diamond lapping sheet provided thereon. While the wire winding block 30 illustrated in FIG. 15 contains the transforming member 33 in the recess 31a of the block main body 31, the elastic member 32 may alternatively be contained in the recess 31a. A rubber sheet 38 is provided on the wire winding block 30, and a diamond lapping sheet 39 is provided on the rubber sheet 38. For example, the rubber sheet 38 is formed of silicone rubber. The diamond lapping sheet 39 corresponds to the lapping member according to the invention.

In the processing apparatus 10 according to the present embodiment, a plate 90 is used instead of the wire winding blocks 30 depending on the purpose. For example, the plate 90 is formed of stainless steel. When the plate 90 is used, the plate 90 is provided on the plate 18; the rubber sheet 38 is provided on the plate 90; and the diamond lapping sheet 39 as shown in FIG. 15 is provided on the rubber sheet 38.

Figure 17:
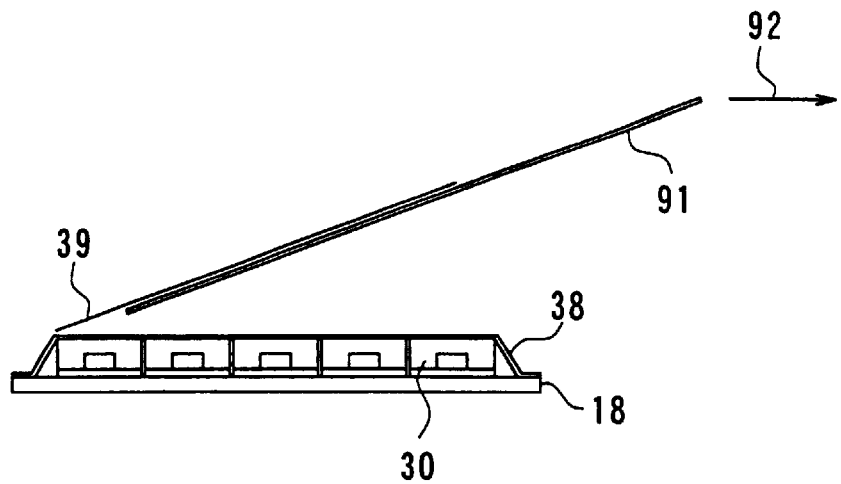
FIG. 17 illustrates an example of a method for providing a rubber sheet and a diamond lapping sheet on the wire winding block shown in FIG. 11.

A description will now be made with reference to FIGS. 17 through 19 on an example of a method for providing the rubber sheet 38 and diamond lapping sheet 39 on the wire winding blocks 30. As shown in FIG. 17, a plurality of wire winding blocks 30 are secured on the plate 18. The rubber sheet 38 is provided such that it covers all of the wire winding blocks 30. In the example shown in FIG. 17, when the diamond lapping sheet 39 is provided on the rubber sheet 38, the diamond lapping sheet 39 is first placed on a piece of ground paper 91. At this time, an edge of the diamond lapping sheet 39 must slightly protrude from an edge of the ground paper 91. Next, the part of the diamond lapping sheet 39 protruding from the edge of the ground paper 91 is aligned with an edge of the region of the rubber sheet 38 where the diamond lapping sheet 39 is to be provided, and the diamond lapping sheet 39 is then stretched on the rubber sheet 38 as the ground paper 91 is pulled in the direction indicated by the arrow 92 with said part held by a hand.

Figure 18:
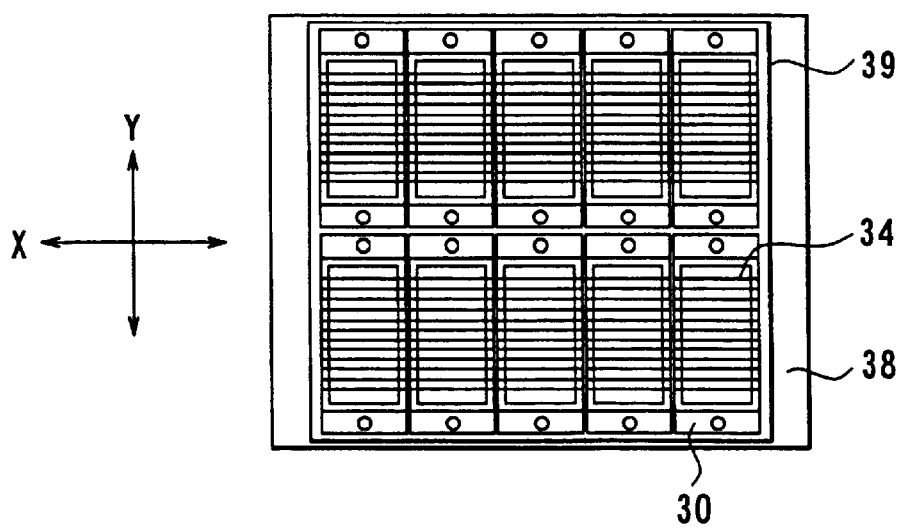
FIG. 18 is a plan view showing a state wherein a rubber sheet and a diamond lapping sheet are stretched on the wire winding block according to the method illustrated in FIG. 17.
Figure 19:
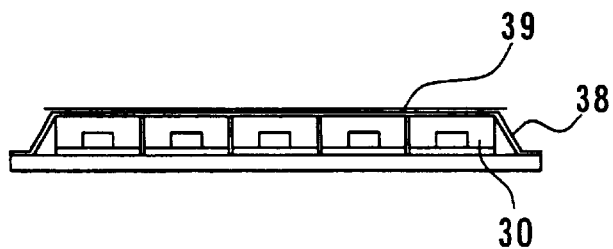
FIG. 19 is a front view of the state shown in FIG. 18.

FIG. 18 is a plan view showing a state wherein the diamond lapping sheet 39 has been stretched on the rubber sheet 38, and FIG. 19 is a front view of the same state. As shown in FIG. 18, the processing apparatus 10 of the present embodiment is provided with ten wire winding blocks 30 in total forming an array of five blocks in the X-direction (horizontal direction indicated by the arrow in FIG. 18) by two blocks in the Y-direction (vertical direction indicated by the arrow in FIG. 18). The wires 34 are arranged in the X-direction.

The slider holding jig setting plate 70 will now be described with reference to FIGS. 20 through 23. Two types of slider holding jig setting plates 70 are prepared for the processing apparatus 10 of the present embodiment. Hereinafter, a slider holding jig setting plate of a first type is represented by a reference number 70A, and a slider holding jig setting plate of a second type is represented by a reference number 70B. The reference number 70 represents both of the two types of slider holding jig setting plates 70A and 70B.

Figure 20:
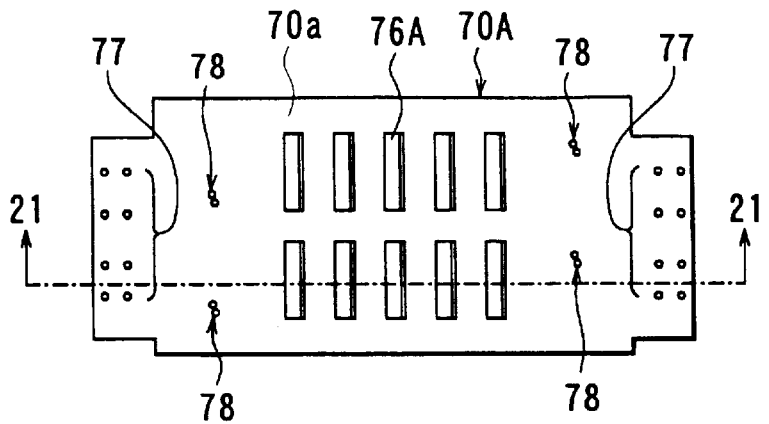
FIG. 20 is a plan view of a slider holding jig setting plate used in a processing apparatus according to an embodiment of the invention.
Figure 21:
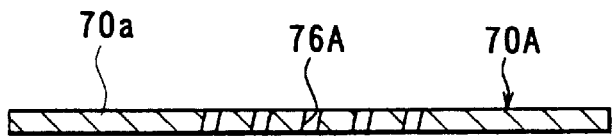
FIG. 21 is a sectional view taken along the line 21—21 in FIG. 20.

FIG. 20 is a plan view of the first type of slider holding jig setting plate 70A, and FIG. 21 is a sectional view taken along the line 21—21 in FIG. 20. As shown in those figures, the slider holding jig setting plate 70A has a main body 70a in the form of a plate provided above the diamond lapping sheet 39 without contacting the same. The main body 70a is formed with ten holes 76A through which the slider holding jig 80 is inserted. The ten holes 76A are provided in a positional relationship with each other similar to that of the ten wire winding blocks 30 shown in FIG. 18. As shown in FIG. 21, the holes 76A are at a predetermined angle to the vertical. Therefore, the holes 76A position the slider holding jig 80 such that a slider is in contact with the diamond lapping sheet 39 with a surface of the slider to face a medium inclined relative to the lapping surface of the diamond lapping sheet 39. The holes 76A correspond to the positioning portion according to the invention.

Figure 22:
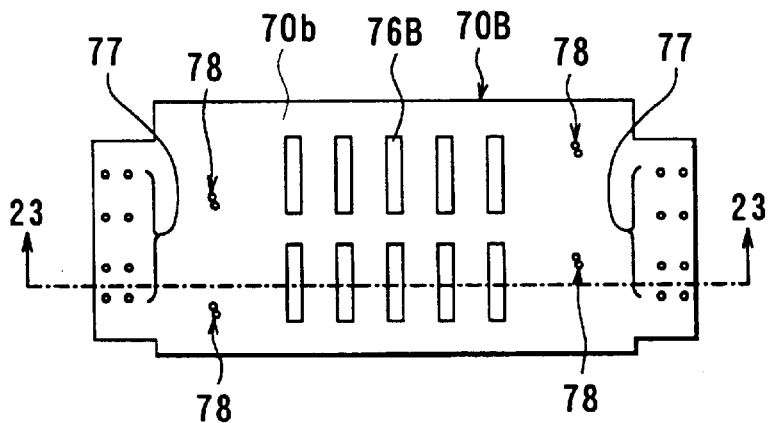
FIG. 22 is a plan view of another slider holding jig setting plate used in a processing apparatus according to an embodiment of the invention.
Figure 23:
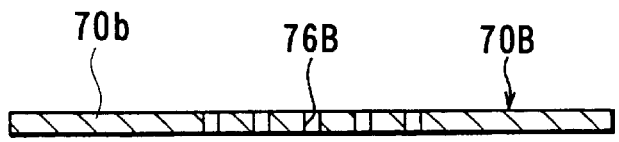
FIG. 23 is a sectional view taken along the line 23—23 in FIG. 22.

FIG. 22 is a plan view of the second type of slider holding jig setting plate 70B, and FIG. 23 is a sectional view taken along the line 23—23 in FIG. 22. As shown in those figures, the slider holding jig setting plate 70B has a main body 70b in the form of a plate provided above the diamond lapping sheet 39 without contacting the same. The main body 70b is formed with ten holes 76B through which the slider holding jig 80 is inserted. The ten holes 76B are provided in a positional relationship with each other similar to that of the ten wire winding blocks 30 shown in FIG. 18. As shown in FIG. 23, the holes 76B extend in the vertical direction. Therefore, the holes 76B position the slider holding jig 80 such that a slider is in contact with the diamond lapping sheet 39 with a surface of the slider to face a medium in parallel with the lapping surface of the diamond lapping sheet 39.

Both of the main bodies 70a and 70b of the slider holding jig setting plates 70A and 70B are formed with a plurality of screw holes 77 through which screws are inserted to secure the plates 70A and 70B to the engaging portions 72 shown in FIGS. 1 and 2. Both of the main bodies 70a and 70b of the slider holding jig setting plates 70A and 70B are formed with screw holes 78 through which screws are inserted to mount the slider holding jig detection sensor 75.

A description will now be made with reference to FIG. 24 on an example of a slider processed by the processing apparatus 10 of the present embodiment. The illustrated slider 150 is used in a thin film magnetic head. It has rail portions whose surfaces are to face a medium (air bearing surfaces), and the rail portions are formed such that outer lateral walls of the rail portions are located inside lateral walls of the slider 150.

Further, the slider 150 is a negative pressure slider having two rail portions 153 whose surfaces are to face a medium. The rail portions 153 are formed such that outer lateral walls 154 of the rail portions 153 are located inside lateral walls 152 of the slider 150 or cut portions of a bar with a predetermined distance therebetween.

Figure 24:
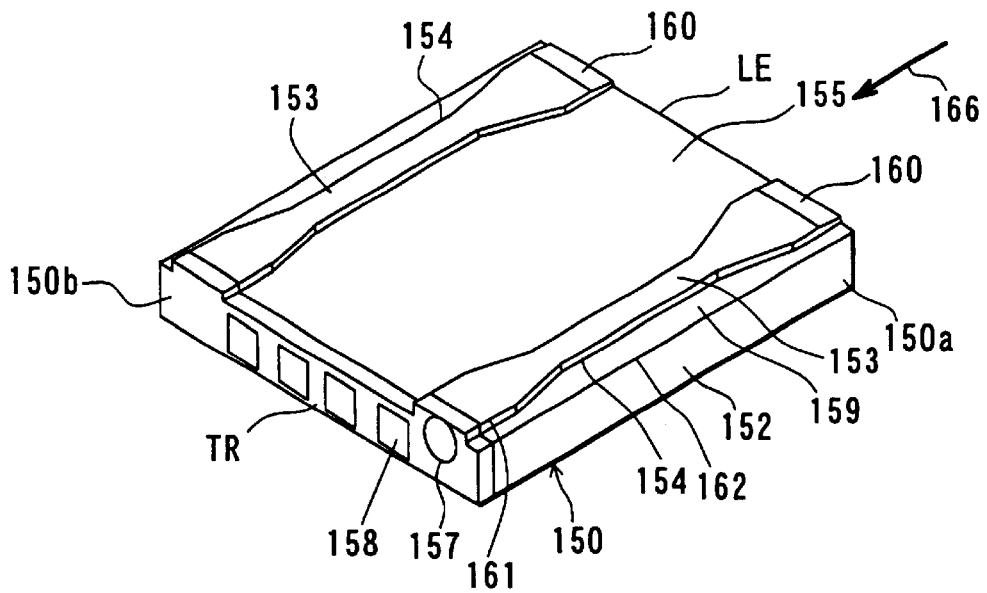
FIG. 24 is a perspective view of an example of a slider processed by a processing apparatus according to an embodiment of the invention.

Referring to FIG. 24, a reference number 166 represents the direction of air flow during the operation. The surface of the slider 150 on the side thereof where air flows in is hereinafter referred to as "inflow side end face LE", and the surface on the side thereof where air flows out is hereinafter referred to as "outflow side end face TR". The "lateral walls" are the surfaces which are formed to extend in the direction in which air flows and which cross the inflow side end face LE, outflow side end face TR and the surfaces to face a medium. In most cases, the inflow side end face LE, outflow side end face TR, surfaces to face a medium and lateral walls are perpendicular to each other. In the slider 150 shown in FIG. 24, the outer laterals 154 of the rail portions 153 are the two lateral walls closest to the slider lateral walls 152 among the lateral walls of the rail portions 153.

A negative pressure generating portion 155 in the form of a recess is defined between the two rail portions 153. The width of the rail portions 153 is not uniform across the air inflow side and the air outflow side thereof. The width is largest at the air inflow side, medium at the air outflow side and smallest in the intermediate region.

In the vicinity of the ends of the rail portions 153 on the air inflow side thereof, there is provided taper portions 160 whose height decreases toward those ends. At the end of the slider 150 on the air outflow side thereof, there is formed a magnetic head element 157 and a terminal 158 connected to the magnetic head element 157. The height of the rail portions 153 (the depth of the negative pressure generating portion 155) of such a slider 150 is on the order of several µm (e.g., 0.5 to 5 µm). The distance between the lateral walls 152 of the slider 150 and the outer lateral walls 154 of the rail portions 153 is on the order of several tens µm (e.g., 10 to 60 µm).

A major part indicated by a reference number 150a of the slider 150 shown in 24 is formed of, for example, aluminum oxide and titanium carbide ($Al_2O_3.TiC$), and a part of the same indicated by a reference number 150b is formed of alumina ($Al_2O_3$) so as to surround the magnetic head element 157 and terminal 158.

Figure 25:
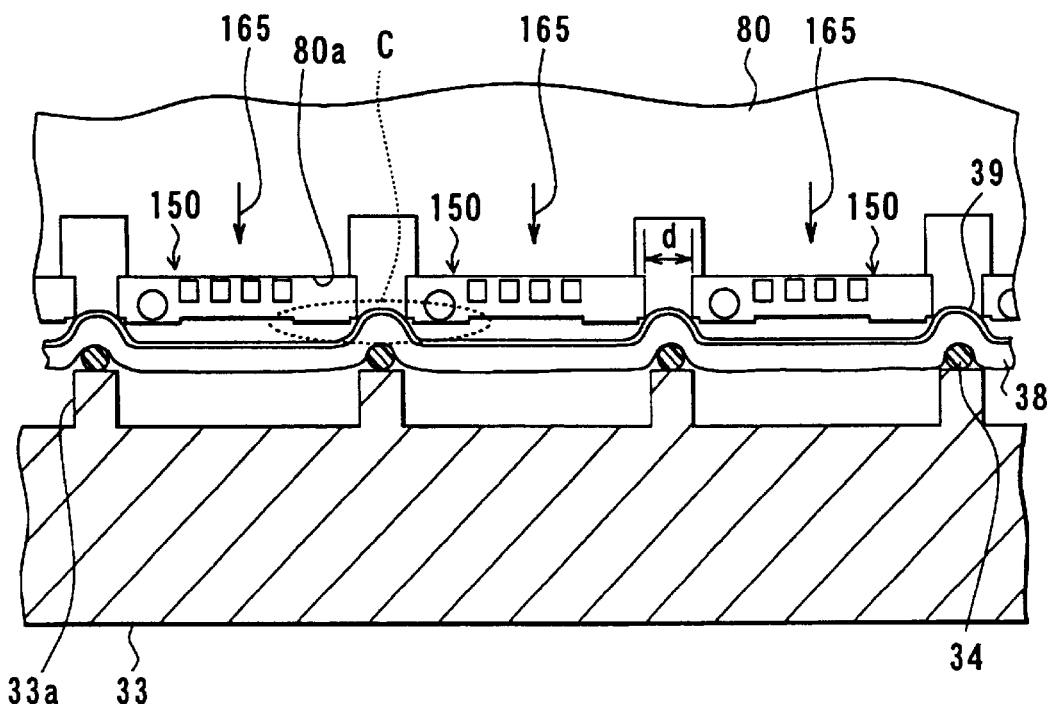
FIG. 25 is a sectional view showing the neighborhood of the slider during the processing performed by the processing apparatus according to the embodiment of the invention.
Figure 26:
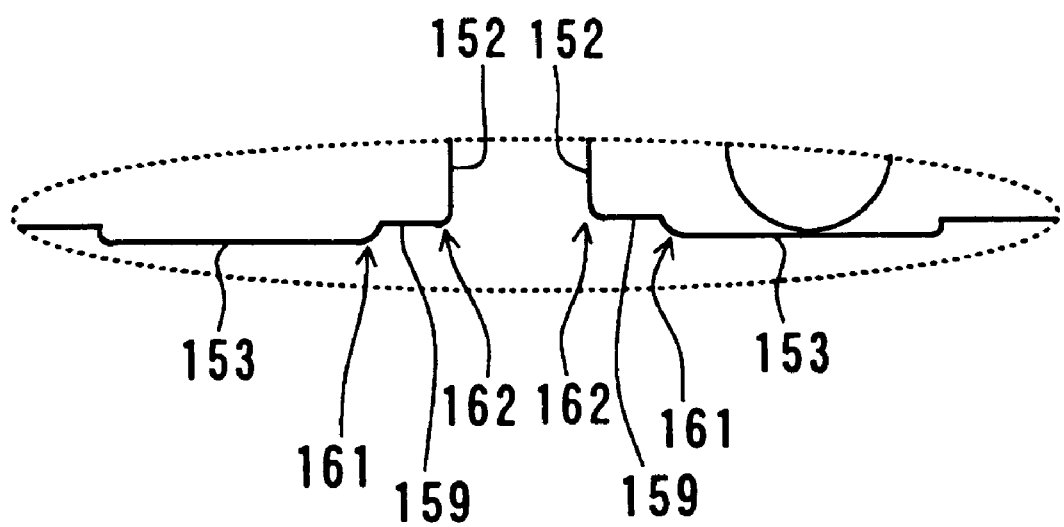
FIG. 26 is an enlarged illustration of the region C in FIG. 25.

The relationship between the wire winding blocks 30 and the slider 150 will now be described with reference to FIGS. 25 and 26. FIG. 25 illustrates the neighborhood of the slider 150 under processing. FIG. 26 is an enlarged view of the region C in FIG. 25. FIG. 25 shows an example wherein wire winding blocks 30 containing the transforming member 33 in the recess 31a of the block main body 31 are used. FIG. 25 shows only the transforming member 33 and wire 34 of such a wire winding block 30.

As shown in FIG. 25, a plurality of slider fixing portions 80a are provided at the lower end of the slider holding jig 80, and a slider 150 to be processed is secured to each of the slider fixing portions 80a by means of, for example, bonding.

The wire 34 provided on the projections 33a of the transforming member 33 is provided in positions corresponding to positions where the individual sliders 150 are separated. As shown in FIG. 26, the positions where the individual sliders 150 are separated are positions corresponding to first edges 161 defined by the surfaces to face a medium of the rail portions 153 of the sliders 150 fixed to the slider holding jig 80 and the outer lateral walls 154 of the rail portions and positions corresponding to second edges 162 defined by the lateral walls 152 of the sliders 150 and the surfaces 159 toward a recording medium (magnetic disc) of the sliders 150 perpendicular thereto. Therefore, the rubber sheet 38 and diamond lapping sheet 39 provided on the wire 34 are transformed such that parts thereof corresponding to the first edges 161 and second edges 162 protrude toward the first edges 161 and second edges 162. As a result, the diamond lapping sheet 39 are put into contact with at least the first edges 161 and second edges 162.

The above-described action similarly occurs in a case wherein the elastic member 32 is contained in the recess 31a of the block main body 31. When the transforming member 33 is contained in the recess 31a of the block member 31, the wire 34 can be moved more easily than in the case where the recess 31a contains the elastic member 32. Therefore, when the transforming member 33 is used as the member contained in the recess 31a, even if there is some shift of the position where the sliders 150 are fixed to the slider holding jig 80, the wire 34 moves to positions corresponding to the separating position between the individual sliders 150 because the rubber sheet 38 and diamond lapping sheet 39 raised by the wire 34 protrude into the separating positions between the individual sliders 150. As a result, the diamond lapping sheet 39 evenly contacts two adjoining sliders 150, which allows uniform chamfering of the sliders 150.

The magnetic head element 157 is formed on the end of the slider 150 at the air outflow side thereof. Therefore, the end of the slider 150 at the air outflow side is preferably processed to a less degree even when chamfered.

When the transforming member 33 is used as the member contained in the recess 31a of the block main body 31, since the wire 34 is located above the projections 33a of the transforming member 33 and the rubber sheet 38 and diamond lapping sheet 39 are located on the wire 34, a large gap is formed between the top surface of the transforming member 33 and the rubber sheet 38 in the region between adjoining projections 33a. As a result, the diamond lapping sheet 39 contacts the sliders 150 more softly in such regions between the adjoining projections 33a. It is therefore possible to suppress the degree of chamfering of edges of the slider 150 on the air outflow side thereof.

While the width and height of the projections 33a of the transforming member 33s are appropriately set in accordance with the distance d between the adjoining sliders 150 fixed to the slider holding jig 80 (hereinafter referred to as "separation widths") and the like, the width of the projections 33a is preferably set within the range from 0.05 to 0.20 mm, and the height of the projections 33a is preferably set within the range from 0.10 to 0.50 mm. The separation width d, the width of the projections 33a and the height of the same in this case are exemplary values of 0.2 mm, 0.15 mm and 0.40 mm, respectively.

For example, the wire 34 is formed of synthetic fiber such as Nylon (trade name), stainless steel and the like. While the outer diameter of the wire 34 is appropriately set in accordance with the separation width d, it is preferably set within the range from 0.03 to 0.20 mm in the present embodiment. The outer diameter of the wire 34 is an exemplary value of 0.09 mm in this case.

While the rubber sheet 38 preferably has hardness in the range from 30 to 60, it is preferably softer, the greater the amount of lapping. In this case, the hardness of the rubber sheet 38 is an exemplary value of 50. The thickness of the rubber sheet 38 is preferably in the range from 0.10 to 0.30 mm. In this case, the thickness of the rubber sheet 38 is an exemplary value of 0.30 mm.

For example, the diamond lapping sheet 39 is provided by forming a layer of a lapping material on a flexible film. The flexible film is formed of, for example, polyethylene terephthalate (PET). For example, the layer of a lapping material is formed by applying particles of diamond on the flexible film along with a binder and by drying the same thereafter. Here, the grain size of the diamond particles is an exemplary value of 0.25 µm. The thickness of the flexible film is preferably in the range from 0 to 6 µm. The thickness 0 µm of the flexible film means a case where the diamond lapping sheet 39 is formed of diamond particles and a binder using no flexible film. Here, the thickness of the flexible film is an exemplary value of 4 µm or 2 µm.

The swing width of the X-Y table 13 in the Y-direction is preferably greater than the swing width in the X-direction. When the separation width d and the outer diameter of the wire 34 are respectively set at 0.2 mm and 0.09 mm as described above, the swing width in the X-direction is preferably in the range from 1 to 5 mm, and the swing width in the Y-direction is preferably in the range from 0.05 to 0.15 mm. Here, the swing width in the X- and Y-directions are exemplary values of 3 mm and 0.08 mm, respectively.

In the processing apparatus 10 of the present embodiment, a plurality of wire winding blocks 30 are provided on the plate 18. Alternatively, one large elastic member or transforming member may be secured on the plate 18 and a wire may be provided on the elastic member or transforming member with both ends thereof secured to the ends of the plate 18. In such a configuration, however, the tension of the wire can be unstable and processing accuracy can be consequently reduced.

According to the present embodiment, the tension of the wire 34 is more stable than in the above-described configuration because only a short part of the wire 34 is located on the top surface of each wire winding block 30. The present embodiment therefore makes it possible to improve processing accuracy.

Figure 27:
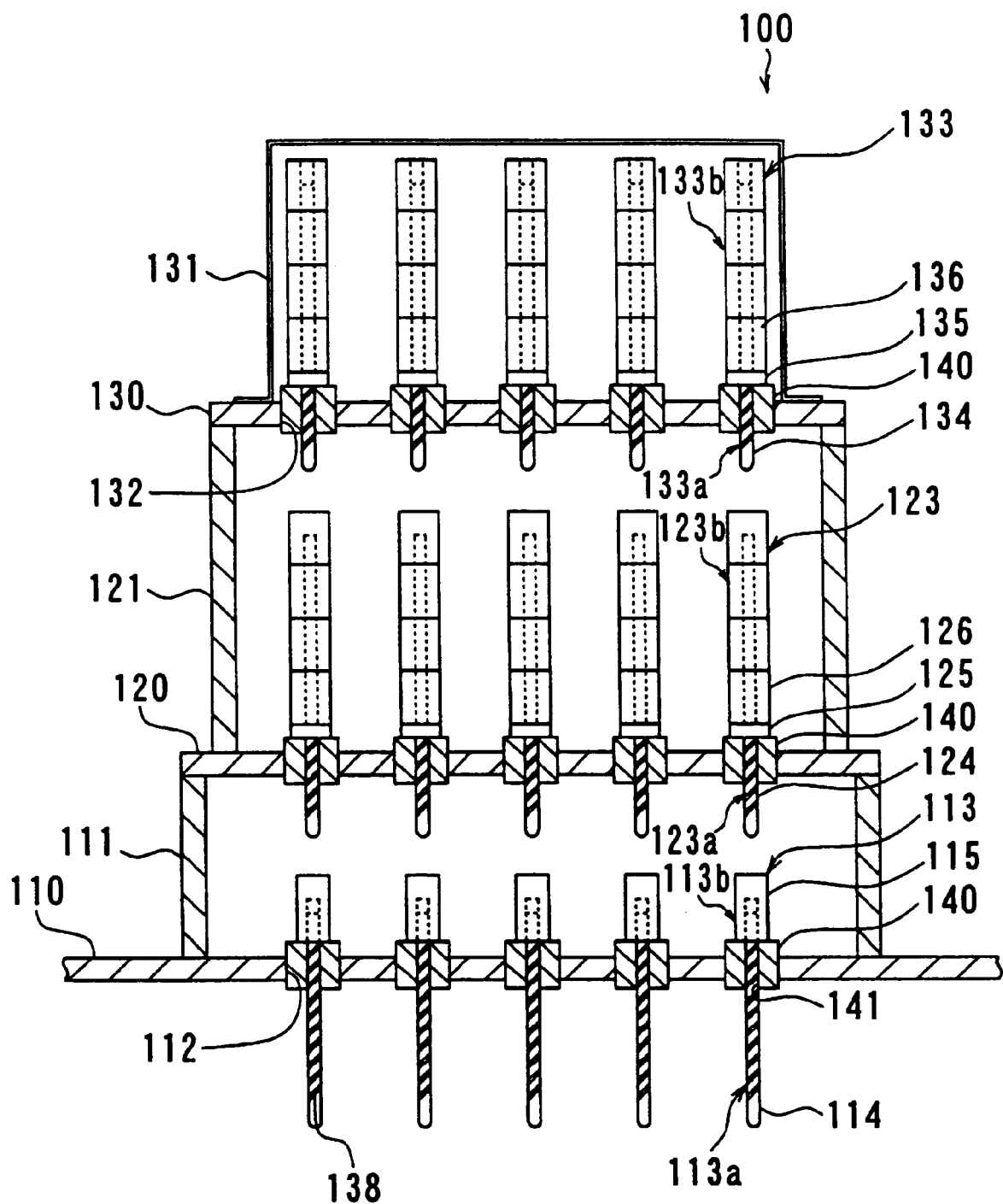
FIG. 27 is a sectional view of a load applying portion in FIG. 1 taken from the front side thereof.
Figure 28:
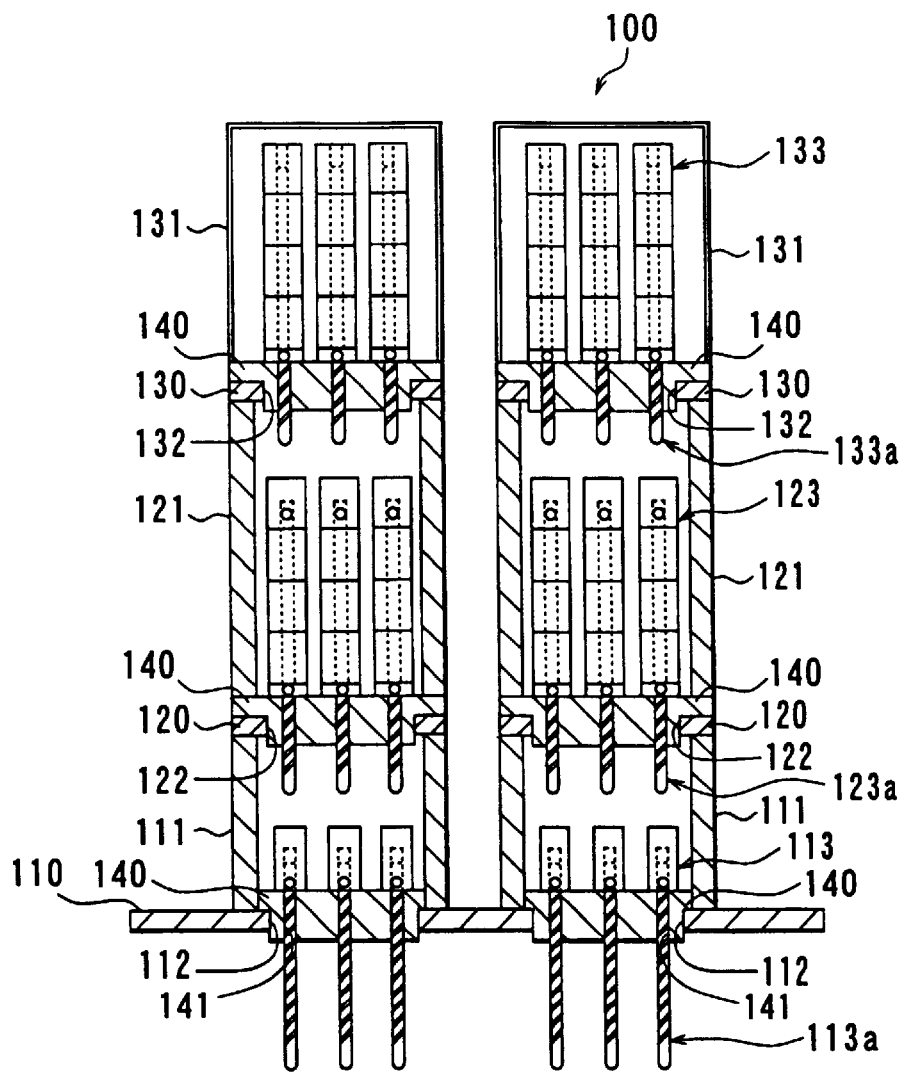
FIG. 28 is a sectional view of the load applying portion in FIG. 1 taken from a side thereof.

A configuration of the load applying portion 100 will now be described with reference to FIGS. 27 and 28. FIG. 27 is a sectional view of the load applying portion 100 taken from the front side thereof. FIG. 28 is a sectional view of the load applying portion 100 taken from a side thereof. As shown in those figures, the load applying portion 100 has a weight holding plate 110 at a first stage, two frames 111 formed only by lateral walls secured on the weight holding plate 110, two weight holding plates 120 at a second stage secured on the respective frames 111, two frames 121 formed only by lateral walls secured on the respective weight holding plates 120, two weight holding plates 130 at a third stage secured on the respective frames 121 and two covers 131 having lateral and upper surfaces secured on the respective weight holding plates 130. The two each frames 111, weight holding plates 120, frames 121, weight holding plates 130 and covers 131 are arranged in a front-and-rear direction.

The weight holding plate 110 is formed with ten holes 112 having a rectangular sectional configuration. The holes 112 are arranged in a positional relationship similar to that of the ten holes 76 of the slider holding jig setting plate 70 shown in FIG. 20 or 22. The weight holding plates 120 and 130 are respectively formed with holes 122 and 132 having the same configuration as the holes 112 in positions corresponding to the holes 112 of the weight holding plate 110. A weight holder 140 is mounted in each of the holes 112, 122 and 132. Each of the weight holders 140 is formed with three holes 141 having a circular sectional configuration extending in the vertical direction. The weight holding plates 110, 120 and 130 and the weight holders 140 correspond to the weight holding portion according to the invention.

Three weights 113 are mounted to each of the weight holders 140 at the first stage. The weight 113 is constituted by a shaft member 114 in the form of an elongate column and a large diameter member 115 in the form of a column greater in the diameter than the shaft member 114 secured to the upper end of the shaft member 114. The lower end face of the shaft member 114 is in a spherical configuration. The large diameter member 115 is formed with a recess having a circular section which is open on the lower end face thereof, and the upper end of the shaft member 114 is inserted in the recess. The large diameter member 115 is screwed to the shaft member 114. The weights 113 thus formed by the shaft member 114 and large diameter member 115 correspond to the blocks having a predetermined weight according to the invention. The block may have any weight. That is, the weight may be varied appropriately depending on the purpose and the like. For example, the weight is 25 g in the present embodiment. The part of the shaft member 114 of the weight 113 at the first stage protruding from the lower end face of the large diameter member 115 constitutes a shaft portion 113a, and the part located above the shaft portion 113a constitutes a large diameter portion 113b. Therefore, the weight holder 140 holds the weight 113 by allowing the shaft portion 113a of the weight 113 to pass therethrough and disallowing the large diameter portion 113b to pass therethrough.

Three weights 123 are mounted to each of the weight holders 140 at the second stage. The weight 123 is constituted by a shaft member 124 in the form of an elongate column, a flange member 125 screwed to the middle of the shaft member 124 and one or more load adjusting blocks 126 attached to a part of the shaft member 124 higher than the flange member 125. The lower end face of the shaft member 124 is in a spherical configuration. The outer diameter of the flange member 125 is greater than the outer diameter of the shaft member 124. The outer diameter of the load adjusting blocks 126 is equal to the outer diameter of the flange member 125. Each of the load adjusting blocks 126 is formed with a hole through which the shaft member 124 can be inserted. By inserting the shaft member 124 into the hole, the plurality of load adjusting blocks 126 can be stacked on the flange member 125. In this case, up to four load adjusting blocks 126 can be stacked.

The combination of the shaft member 124 and flange member 125 of the weight 123 at the second stage corresponds to the block having a predetermined weight according to the invention, and the weight of the same is, for example, 25 g. Each of the load adjusting blocks 126 also corresponds to the block having a predetermined weight according to the invention and, for example, it weighs 25 g. Therefore, by changing the number of the load adjusting blocks 126, the weight of a weight 123 as a whole can be varied within the range from 25 g to 125 g, 25 g being one increment or decrement.

The uppermost load adjusting block 126 of the weight 123 at the second stage is locked with a screw in a constant position relative to the shaft member 124, i.e., the position of the uppermost block 126 in the case that four load adjusting blocks 126 are stacked, regardless of the number of the load adjusting blocks 126. The reason is that it is necessary to urge the weight 133 at the third stage upward with the uppermost load adjusting block 126.

The part of the shaft member 124 of the weight 123 at the second stage protruding from the lower end face of the flange member 125 constitutes a shaft portion 123a, and the part located above the shaft portion 123a constitutes a large diameter portion 123b. Therefore, the weight holder 140 holds the weight 123 by allowing the shaft portion 123a of the weight 123 to pass therethrough and disallowing the large diameter portion 123b to pass therethrough.

Three weights 133 are mounted to each of the weight holders 140 at the third stage. The weight 133 is constituted by a shaft member 134 in the form of an elongate column, a flange member 135 screwed to the middle of the shaft member 134 and one or more load adjusting blocks 136 attached to a part of the shaft member 134 higher than the flange member 135. The lower end face of the shaft member 134 is in a spherical configuration. The outer diameter of the flange member 135 is greater than the outer diameter of the shaft member 134. The outer diameter of the load adjusting blocks 136 is equal to the outer diameter of the flange member 135. Each of the load adjusting blocks 136 is formed with a hole through which the shaft member 134 can be inserted. By inserting the shaft member 134 into the hole, the plurality of load adjusting blocks 136 can be stacked on the flange member 135. In this case, up to four load adjusting blocks 136 can be stacked.

The combination of the shaft member 134 and flange member 135 of the weight 133 at the third stage corresponds to the block having a predetermined weight according to the invention, and the weight of the same is, for example, 25 g. Each of the load adjusting blocks 136 also corresponds to the block having a predetermined weight according to the invention and, for example, it weighs 25 g. Therefore, by changing the number of the load adjusting blocks 136, the weight of a weight 133 as a whole can be varied within the range from 25 g to 125 g, 25 g being one increment or decrement.

It is not necessary to screw the uppermost load adjusting block 136 of the weight 133 at the third stage in a constant position relative to the shaft member 134.

The part of the shaft member 134 of the weight 133 at the third stage protruding from the lower end face of the flange member 135 constitutes a shaft portion 133a, and the part located above the shaft portion 133a constitutes a large diameter portion 133b. Therefore, the weight holder 140 holds the weight 133 by allowing the shaft portion 133a of the weight 133 to pass therethrough and disallowing the large diameter portion 133b to pass therethrough.

A spiral groove 138 is formed on the shaft portions 113a, 123a and 133a of the respective weights 113, 123 and 133. The grooves 138 have a function of collecting chips (particles) generated by friction between the shaft portions 113a, 123a and 133a and the holes of the weight holders 140 to maintain a smooth operation of the shaft portions 113a, 123a and 133a.

Figure 29:
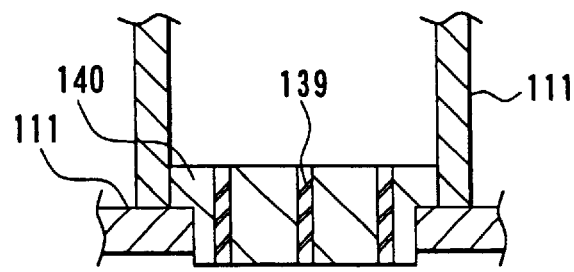
FIG. 29 is a sectional view of a weight holder shown in FIG. 28 with spiral grooves formed on the holes thereof.

The same effect can be achieved by forming spiral grooves 139 on the holes of the weight holders 140 as shown in FIG. 29. This effect can be achieved by providing at least either the grooves 138 or grooves 139.

As shown in FIG. 1, guides 101 extending in the Y-direction are provided on the rail portions 29 provided on the base portion 12. Y-direction movable portions 103 are provided on the guides 101. The movable portions 103 are provided with engaging portions 102 which engage the guides 101. A movement of the engaging portions 102 along the guides 101 causes the movable portions 103 to move in the Y-direction. The movable portions 103 are provided with guides 104 extending in the vertical direction.

Both ends of the weight holding plate 110 in the horizontal direction are coupled to vertically movable portions 109. The movable portions 109 are provided with engaging portions 105 which engage the guides 104. A movement of the engaging portions 105 along the guides 104 causes the movable portions 109 to move in the vertical direction.

The vertically movable portions 109 are driven by vertical driving cylinders 108 in the vertical direction. The vertical driving cylinders 108, vertically movable portions 109, guides 104 and engaging portions 105 correspond to the holding portion moving means (device) according to the invention. The Y-direction movable portions 103 are driven in the Y-direction by Y-direction driving cylinders 107 shown in FIG. 2.

Thus, the load applying portion 100 can be moved in the Y-direction and vertical direction. While FIG. 2 shows a state in which the load applying portion 100 has been moved backward to be retracted from a position above the X-Y table 103, the load applying portion 100 can be moved forward to be located above the X-Y table 13.

The load applying portion 100 moves the weights from a state in which the lower end of the shaft portion 113a of the weight 113 at the bottom stage is located above the slider holding jig 80 without contacting the slider holding jig 80, thereby loading the slider holding jig 80 with the weights 113, 123 and 133 provided in the form of a plurality of stages sequentially from the bottom stage. This operation will be described with reference to FIGS. 30 through 33.

Figure 30:
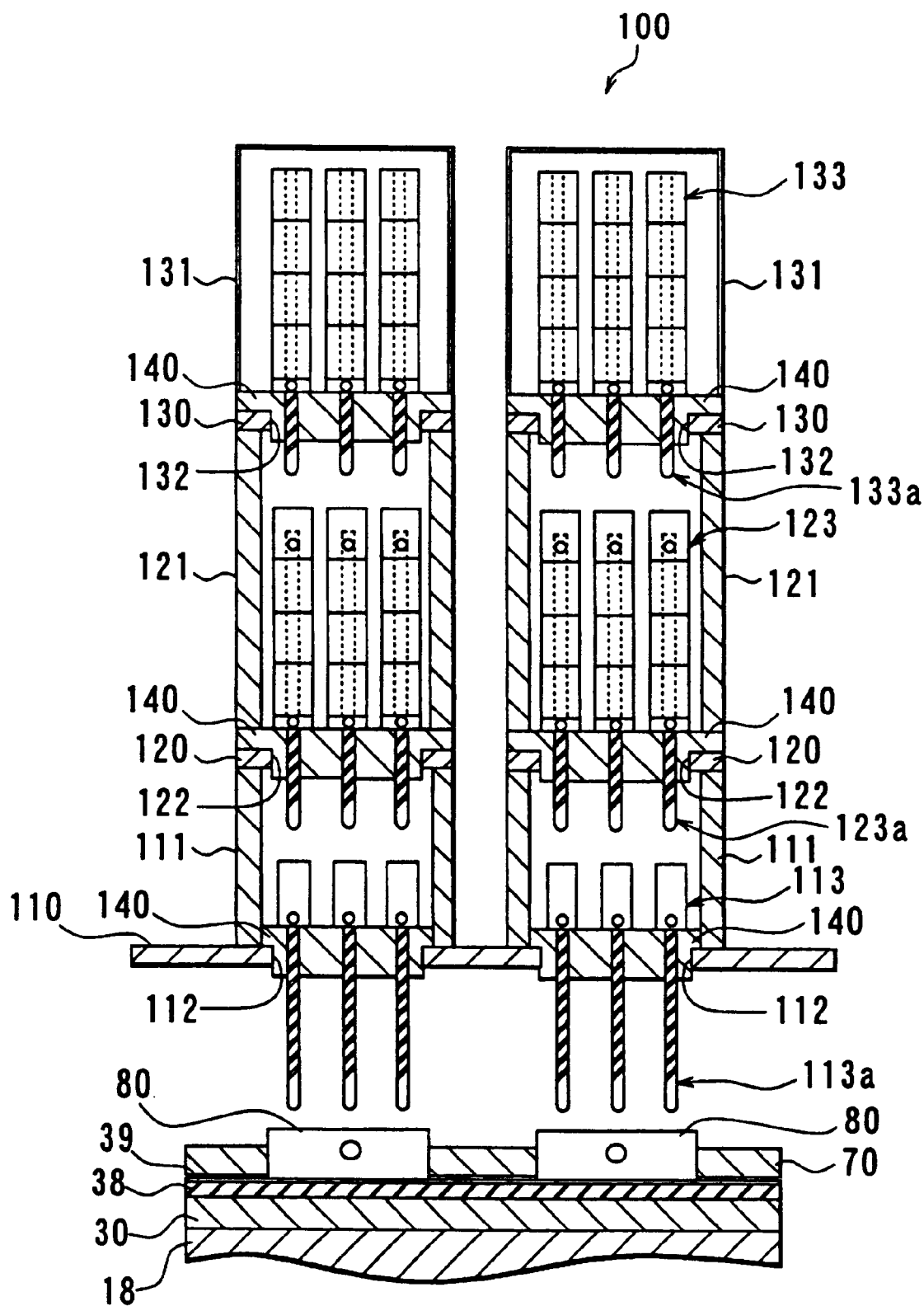
FIG. 30 is a sectional view showing the operation of a load applying portion in FIG. 1.

FIG. 30 shows the load applying portion 100 in a state in which the lower ends of the shaft portions 113a of the weights 113 at the bottom stage are located above the slider holding jig 80. In this state, no external load is applied to the slider holding jig 80.

Figure 31:
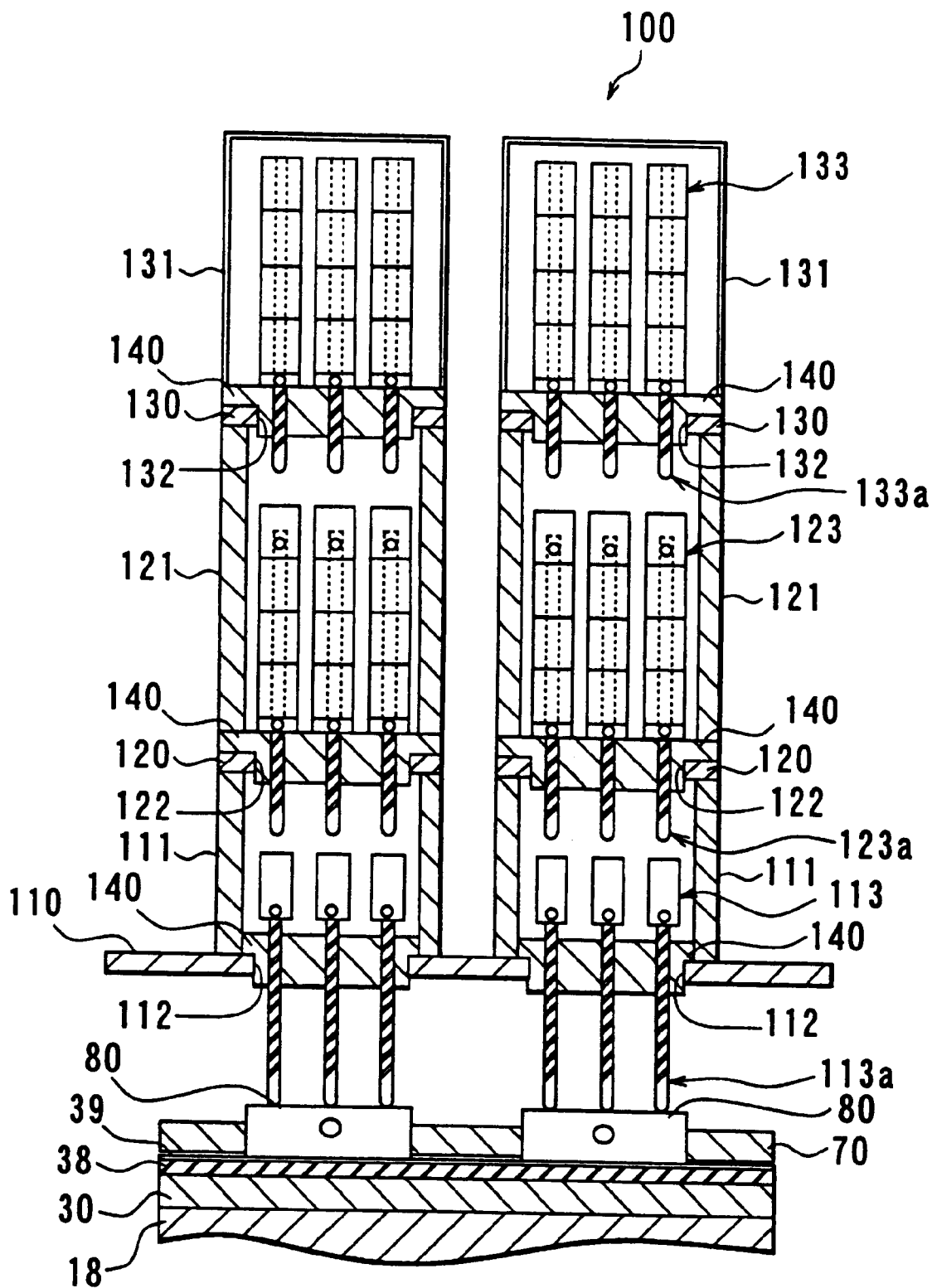
FIG. 31 is a sectional view showing the operation of the load applying portion in FIG. 1.

FIG. 31 shows a state in which the load applying portion 100 has been moved downward from the state shown in FIG. 30 to put the lower ends of the shaft portions 113a of the weights 113 at the bottom stage in contact with the upper end of the slider holding jig 80, thereby raising the weights 113 above the weight holders 140 at the bottom stage. In the state shown in FIG. 31, the upper ends of the weights 113 are not in contact with the lower ends of the shaft portions 123a of the weights 123 at the second stage. In this state, the slider holding jig 80 is loaded with only the weights 113 at the bottom stage. Since one slider holding jig 80 is loaded with three weights 113, a load of 75 g is applied to one slider holding jig 80 where one weight 113 is 25 g.

Figure 32:
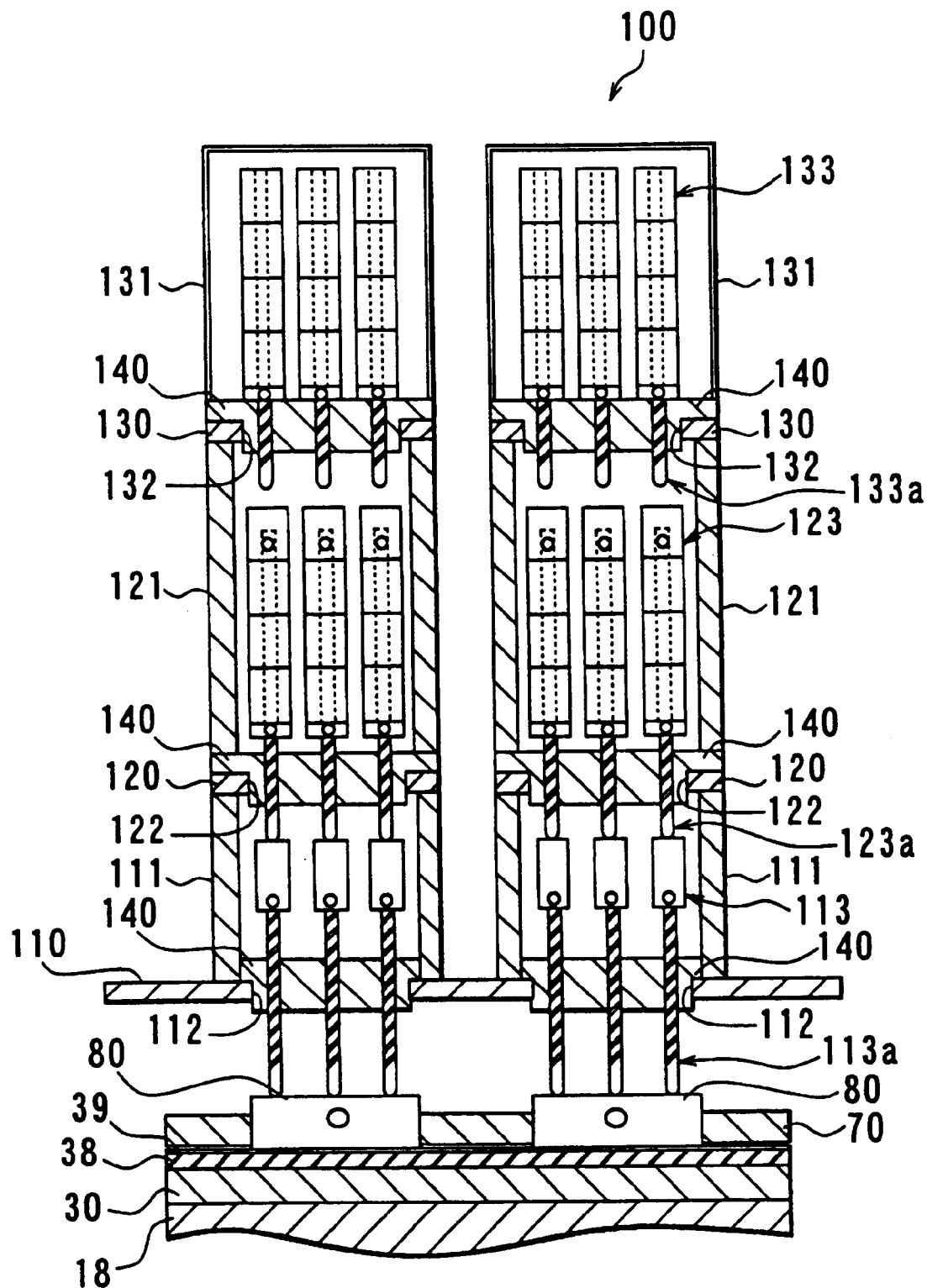
FIG. 32 is a sectional view showing the operation of the load applying portion in FIG. 1.

FIG. 32 shows a state in which the load applying portion 100 has been further moved downward from the state shown in FIG. 31 to put the upper ends of the weights 113 at the bottom stage in contact with the lower ends of the shaft portions 123a of the weights 123 at the second stage, thereby raising the weights 123 above the weight holders 140 at the second stage. In the state shown in FIG. 32, the upper ends of the weights 123 are not in contact with the lower ends of the shaft portions 133a of the weights 133 at the third stage. In this state, the slider holding jig 80 is loaded with the weights 113 at the bottom stage and the weights 123 at the second stage. Since one slider holding jig 80 is loaded with three weights 113 and three weights 123, a load of 450 g is applied to one slider holding jig 80 where one weight 113 is 25 g and one weight 123 is 125 g.

Figure 33:
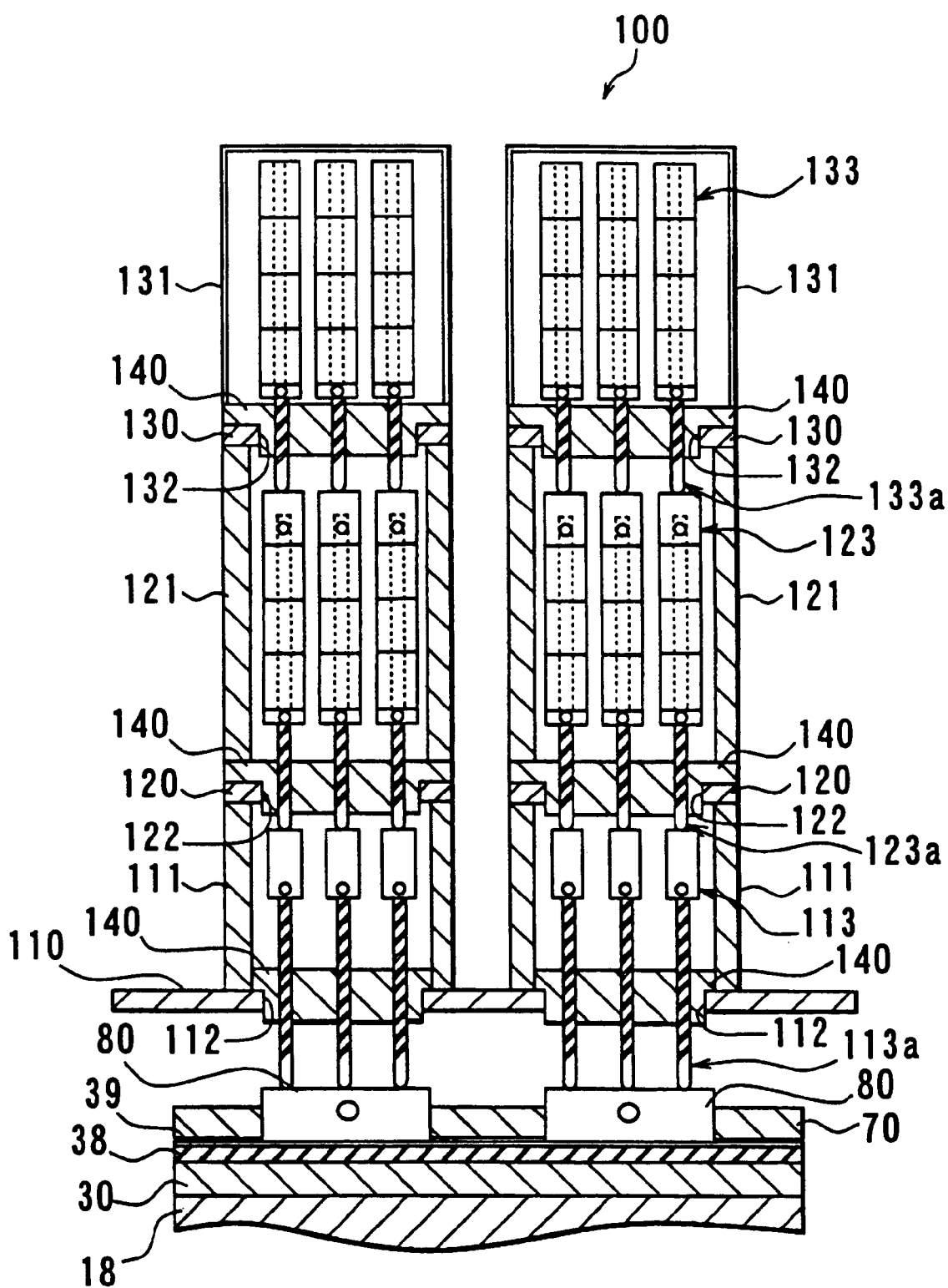
FIG. 33 is a sectional view showing the operation of the load applying portion in FIG. 1.

FIG. 33 shows a state in which the load applying portion 100 has been further moved downward from the state shown in FIG. 32 to put the upper ends of the weights 123 at the second stage in contact with the lower ends of the shaft portions 133a of the weights 133 at the third stage, thereby raising the weights 133 above the weight holders 140 at the third stage. In this state, the slider holding jig 80 is loaded with the weights 113 at the bottom stage, the weights 123 at the second stage and the weights 133 at the third stage. Since one slider holding jig 80 is loaded with three weights 113, three weights 123 and three weights 133, a load of 825 g is applied to one slider holding jig 80 where one weight 113 is 25 g; one weight 123 is 125 g; and one weight 133 is 125 g.

In order to achieve such a function of the load applying portion 100, the distance that the weights 113 at the bottom stage can move in the vertical direction must be greater than the sum of the distance between the upper ends of the weights 113 and the lower ends of the shaft portions 123a of the weights 123 and the distance between the upper ends of the weights 123 and the lower ends of the shaft portions 133a of the weights 133 in a state in which no load is applied to the slider holding jig 80 (the state shown in FIG. 30).

As described above, according to the present invention, the load applied to the slider holding jig 80 can be adjusted by loading the slider holding jig 80 with the plurality of weights 113, 123 and 133 in a stepwise manner.

According to the present embodiment, it is therefore possible, for example, to chamfer an edge of the rail portions of the slider 150 by applying a small load to the slider holding jig 80 when the edge has not been chamfered yet or at an early stage of chamfering and to increase the load applied to the slider holding jig 80. This makes it possible to prevent an edge of the slider 150 from cutting the thin diamond lapping sheet 39. The number per stage of the weights for applying a load to one slider 150 may be two, four or more instead of being limited to three. The weight of each of the weights 113, 123 and 133 of the load applying portion 100 and the weight of the block constituting each of the weights 113, 123 and 133 may be changed appropriately.

Although not shown, the processing apparatus of the present embodiment is further equipped with a control portion to which signals in response to operations on the operation panel 23 and signals output by each sensor are input and which controls each driving part.

An operation of the processing apparatus 10 of the present embodiment will now be described. The following description also provides an explanation of a method for processing a slider according to the invention.

When sliders 150 are processed using the processing apparatus 10, a plurality of sliders 150 to be processed are first secured to the slider holding jig 80 by means of, for example, bonding with the surfaces thereof to face a recording medium facing downward. The sliders 150 at this point is obtained by performing ion milling to form rail portions on a bar which includes a plurality of magnetic head elements arranged in a row and for which chamfering of surfaces to face a medium has been finished and then cutting the bar.

According to the present embodiment, preferably, a chamfering process having three steps is performed on a slider holding jig 80 having the sliders 150 secured thereon.

Figure 16:
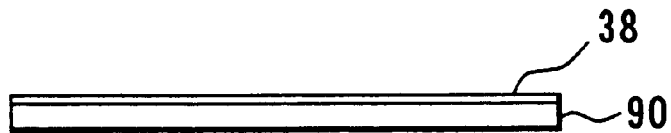
FIG. 16 is a front view showing a plate used in place of the wire winding block shown in FIG. 11 and a rubber sheet provided thereon.
Figure 34:
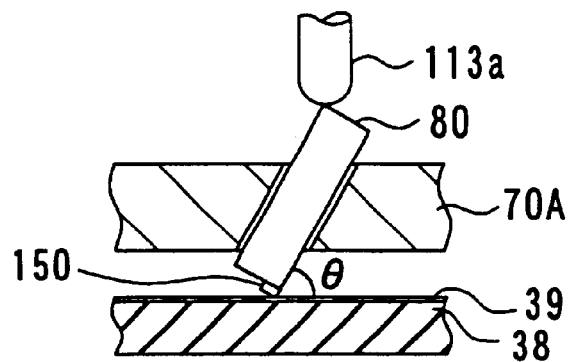
FIG. 34 is a sectional view illustrating a first step of chamfering of a processing method according to an embodiment of the invention.

FIG. 34 illustrates a first step of chamfering. At the first step of chamfering, the plate 90 as shown in FIG. 16 is used instead of the wire winding blocks 30. The rubber sheet 38 is provided on the plate 90, and the diamond lapping sheet 39 is provided on the rubber sheet 38. The plate 70A is used as the slider holding jig setting plate 70. As shown in FIG. 34, at the first step of chamfering, the plate 70A positions the slider holding jig 80 such that the sliders 150 are in contact with the diamond lapping sheet 39 with the surfaces of the sliders 150 to face a medium inclined relative to the lapping surface of the diamond lapping sheet 39.

In the present embodiment, when the slider holding jig 80 is positioned by the plate 70A, the sliders 150 are secured to the slider holding jig 80 such that the surfaces to face a medium of the sliders 150 on the side of the air inflow ends thereof are located downward.

An angle θ defined by the lateral walls of the slider holding jig 80 and the lapping surface of the diamond lapping sheet 39 is preferably equal to or greater than 60° and smaller than 90°, and an angle of 70°±2.5° is especially preferable.

The lower ends of the shaft portions 113a of the weights 113 at the bottom stage is in contact with the upper end of the slider holding jig 80. As described above, the load applied to the slider holding jig 80 can be adjusted. The load applied to the slider holding jig 80 is preferably increased in a stepwise manner depending on the progress of chamfering.

At the first step of chamfering, the X-Y table 13 is swung in the state shown in FIG. 34 to chamfer only edges of the sliders 150 on the side of the air inflow ends thereof.

Figure 35:
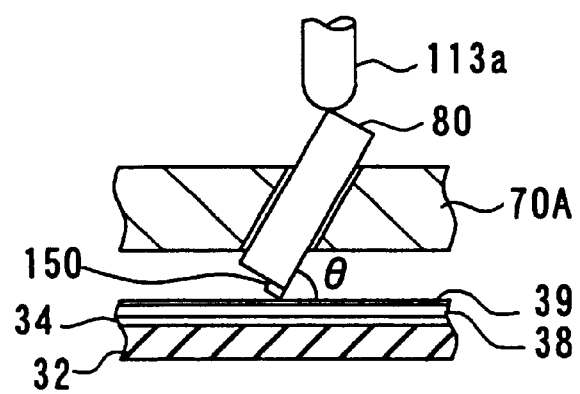
FIG. 35 is a sectional view illustrating a second step of chamfering of the processing method according to the embodiment of the invention.

FIG. 35 illustrates a second step of chamfering. The second step of chamfering employs the wire winding blocks 30 containing the elastic members 32 in the recesses 31a of the block main bodies 31. Therefore, the wire 34 is provided on the elastic members 32; the rubber sheet 38 is provided on the wire 34; and the diamond lapping sheet 39 is provided on the rubber sheet 38. The plate 70A is used as the slider holding jig setting plate 70. As shown in FIG. 35, at the second step of chamfering, the plate 70A positions the slider holding jig 80 such that the sliders 150 are in contact with the diamond lapping sheet 39 with the surfaces of the sliders 150 to face a medium inclined relative to the lapping surface of the diamond lapping sheet 39.

An angle θ defined by the lateral walls of the slider holding jig 80 and the lapping surface of the diamond lapping sheet 39 is preferably equal to or greater than 60° and smaller than 90°, and an angle around 70° is especially preferable.

The lower ends of the shaft portions 113a of the weights 113 at the bottom stage is in contact with the upper end of the slider holding jig 80. As described above, the load applied to the slider holding jig 80 can be adjusted. The load applied to the slider holding jig 80 is preferably increased in a stepwise manner depending on the progress of chamfering.

At the second step of chamfering, as shown in FIG. 25, the rubber sheet 38 and diamond lapping sheet 39 provided on the wire 34 are transformed such that the parts thereof corresponding to first edges 161 and second edges 162 of the sliders 150 protrude toward the first edges 161 and second edges 162. As a result, the diamond lapping sheet 39 contacts at least the first edges 161 and second edges 162.

At the second step of chamfering, the X-Y table 13 is swung in the state shown in FIG. 35 to chamfer the edges of the sliders 150 on the side of the air inflow ends thereof further and to chamfer the first edges 161 and second edges 162 having steps simultaneously. Thus, as a result of the first and second steps of chamfering, the edges of the sliders on the side of the air inflow ends thereof are chamfered in a greater amount than other edges. The edges of the sliders 150 on the side of the air inflow ends thereof are chamfered in a greater amount because the edges on the side of the air inflow ends are more likely to contact a recording medium than other edges. Further, the first and second steps of chamfering chamfer the edges of the sliders 150 on the side of the air inflow end thereof into slanting surfaces.

Figure 36:
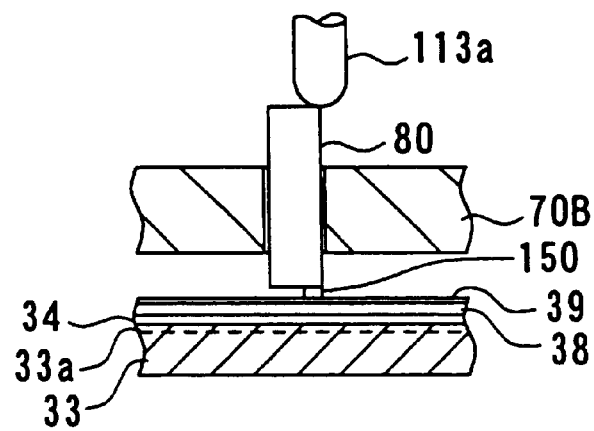
FIG. 36 is a sectional view illustrating a third step of chamfering of the processing method according to the embodiment of the invention.

FIG. 36 illustrates a third step of chamfering. The third step of chamfering employs the wire winding blocks 30 containing the transforming members 33 in the recesses 31a of the block main bodies 31. Therefore, the wire 34 is provided on the projections 33a of the elastic members 33; the rubber sheet 38 is provided on the wire 34: and the diamond lapping sheet 39 is provided on the rubber sheet 38. The plate 70B is used as the slider holding jig setting plate 70. As shown in FIG. 36, at the third step of chamfering, the plate 70B positions the slider holding jig 80 such that the sliders 150 are in contact with the diamond lapping sheet 39 with the surfaces of the sliders 150 to face a medium in parallel with the lapping surface of the diamond lapping sheet 39.

The lower ends of the shaft portions 113a of the weights 113 at the bottom stage is in contact with the upper end of the slider holding jig 80. The surfaces to face a medium of the sliders 150 on the side of the air inflow ends thereof are located at the right side of the sliders 150 as shown in FIG. 36. In the present embodiment, as shown in FIG. 36, the lower ends of the shaft portions 113a are put into contact with the upper end of the slider holding jig 80 in a position biased toward the right side thereof in order to chamfer the surfaces to face a medium of the sliders 150 on the side of the air inflow ends thereof in a greater amount. As described above, the load applied to the slider holding jig 80 can be adjusted. The load applied to the slider holding jig 80 is preferably increased in a stepwise manner depending on the progress of chamfering.

At the third step of chamfering, the rubber sheet 38 and diamond lapping sheet 39 provided on the wire 34 are transformed such that the parts thereof corresponding to the first edges 161 and second edges 162 of the sliders 150 protrude toward the first edges 161 and second edges 162. As a result, the diamond lapping sheet 39 contacts at least the first edges 161 and second edges 162.

At the third step of chamfering, the X-Y table 13 is swung in the state shown in FIG. 36. As a result, the entire edges of the rail portions 153 of the sliders 150 including the first edges 161 are chamfered simultaneously with the second edges 162. At the third step of chamfering, edges in contact with the diamond lapping sheet 39 including the edges chamfered into slanting surfaces at the first and second steps of chamfering are chamfered into curved surfaces.

While the first through third steps of chamfering may be carried out using one processing apparatus 10 with the wire winding blocks 30, slider holding jig setting plate 70 and the like replaced at each step, it is more efficient to use three processing apparatuses 10 which are set for respective steps.

Such a method for processing a slider according to the present embodiment makes it possible to chamfer the edges of the sliders 150 on the side of the air inflow ends thereof in a greater amount than other edges. The anti-shock properties of the sliders 150 can be thus improved.

A comparison of edge configurations will now be made between a case wherein the three steps of chamfering are performed on the edges of sliders 150 on the side of the air inflow ends thereof and cases wherein other methods for chamfering are carried out on the same.

Figure 37:
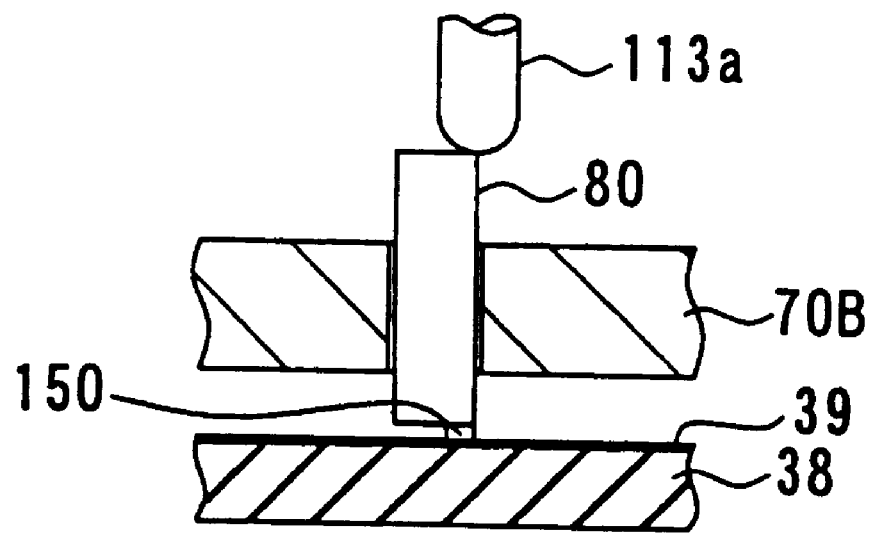
FIG. 37 is a sectional view illustrating another method for chamfering presented for comparison with the processing method according to the embodiment of the invention.
Figure 38:
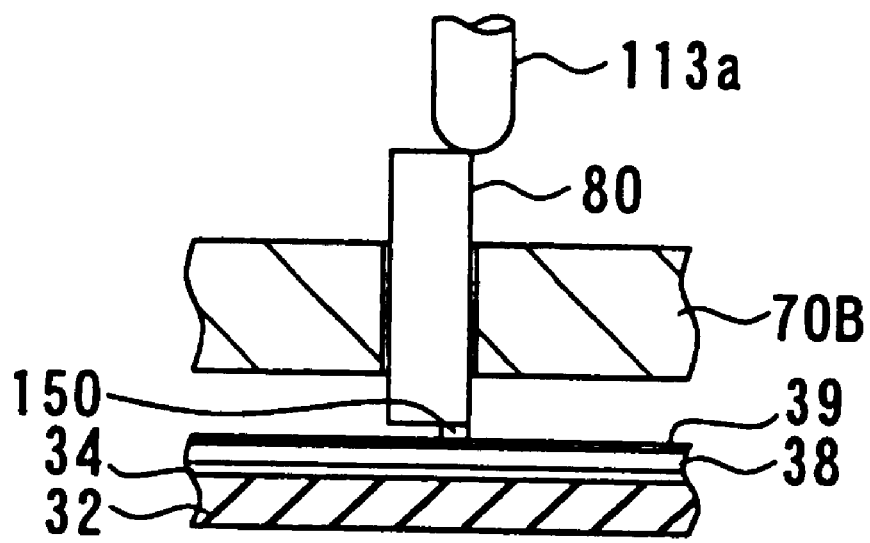
FIG. 38 is a sectional view illustrating still another method for chamfering presented for comparison with the processing method according to the embodiment of the invention.

The methods illustrated in FIGS. 37 and 38 are used as the other methods for chamfering for comparison. According to the method shown in FIG. 37, the plate 90 as shown in FIG. 16 is used instead of the wire winding blocks 30 similarly to the first step of chamfering shown in FIG. 34. The rubber sheet 38 is provided on the plate 90, and the diamond lapping sheet 39 is provided on the rubber sheet 38. The plate 70B is used as the slider holding jig setting plate 70. Therefore, according to the method shown in FIG. 37, the slider holding jig 80 is positioned such that the sliders 150 are in contact with the diamond lapping sheet 39 with the surfaces of the sliders 150 to face a medium in parallel with the lapping surface of the diamond lapping sheet 39. The X-Y table 13 is swung in this state to chamfer the edges of the sliders 150.

According to the method shown in FIG. 38, the wire winding blocks 30 containing the elastic members 32 in the recesses 31a of the block main bodies 31 are used similarly to the second step of chamfering shown in FIG. 35. Therefore, the wire 34 is provided on the elastic members 32; the rubber sheet 38 is provided on the wire 34; and the diamond lapping sheet 39 is provided on the rubber sheet 38. The plate 70B is used as the slider holding jig setting plate 70. Therefore, according to the method shown in FIG. 38, the slider holding jig 80 is positioned such that the sliders 150 are in contact with the diamond lapping sheet 39 with the surfaces of the sliders 150 to face a medium in parallel with the lapping surface of the diamond lapping sheet 39. The X-Y table 13 is swung in this state to chamfer the edges of the sliders 150.

Figure 39:
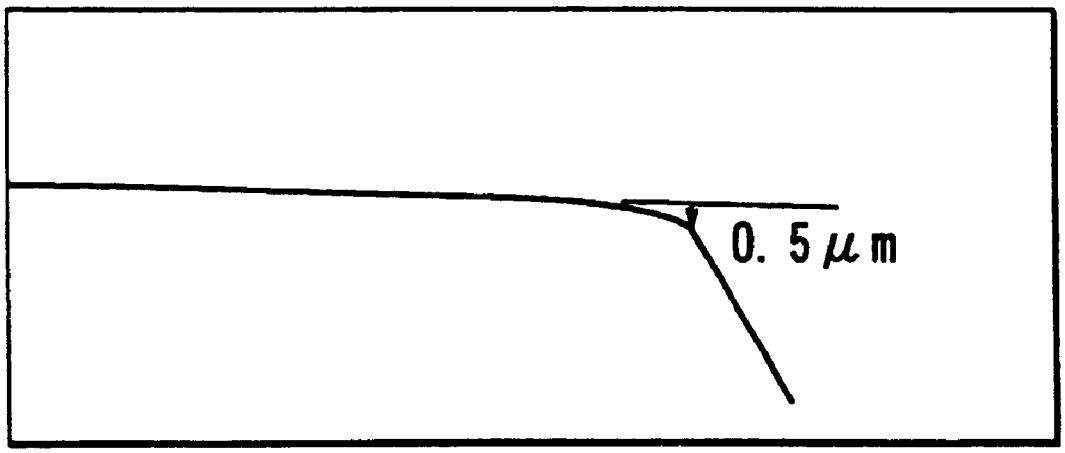
FIG. 39 illustrates an example of the shape of an edge of a slider at an air inflow side thereof which has been chamfered according to the method shown in FIGS. 37 or 38.
Figure 40:
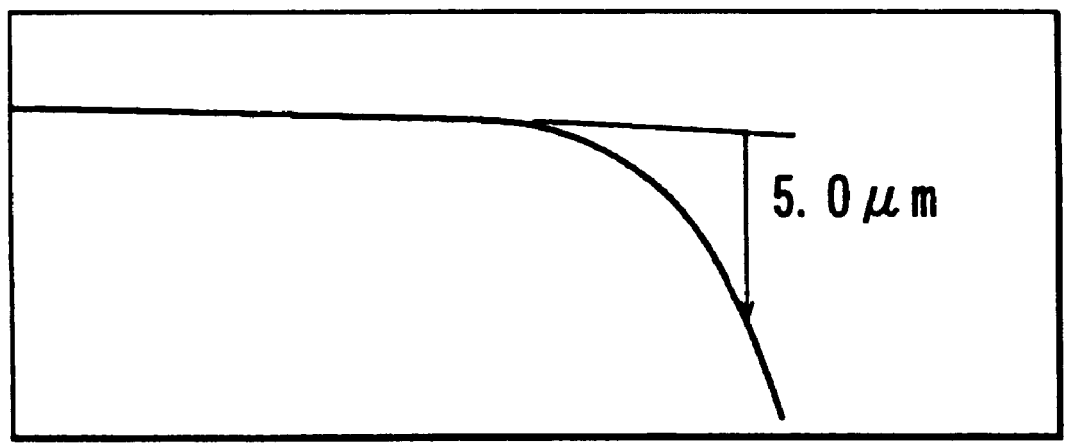
FIG. 40 illustrates an example of the shape of an edge of a slider at an air inflow side thereof which has been chamfered in three steps according to an embodiment of the invention.

FIG. 39 shows an example of a configuration of an edge of a slider 150 on the side of the air inflow end thereof chamfered according to the method shown in FIGS. 37 or 38. FIG. 40 shows an example of a configuration of an edge of a slider 150 on the side of the air inflow end thereof chamfered by the three steps of chamfering according to the present embodiment. The configurations shown in FIGS. 39 and 40 were measured using a probe type surface roughness meter. Talystep (trade name) manufactured by Rank Taylor-Hobson, U.K, was used as the probe type surface roughness meter. The probe used had a radius of curvature of 2 $\mu$m at the end thereof. The horizontal axes and vertical axes of FIGS. 39 and 40 represent positions in the horizontal and vertical directions, respectively.

In the configuration shown in FIG. 39, the length of the chamfered region in the direction of the height thereof was 0.5 $\mu$m. In the configuration shown in FIG. 40, the length of the chamfered region in the direction of the height thereof was 5.0 $\mu$m. Those figures indicate that the three steps of chamfering according to the present embodiment make it possible to chamfer the edges of slider 150 on the side of the air inflow ends thereof in a greater amount, thereby allowing an improvement of the anti-shock properties of the sliders 150.

A description will now be made with reference to FIGS. 41 through 46 on the relationship between the angle $\theta$ defined by the lateral walls of the slider holding jig 80 and the lapping surface of the diamond lapping sheet 39 and configurations of chamfered edges according to the present embodiment.

Figure 41:
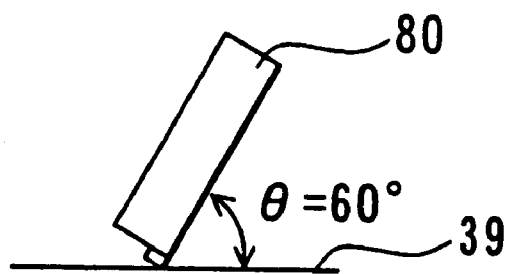
FIG. 41 illustrates a slider holding jig according to an embodiment of the invention wherein a lateral wall of the slider holding jig and a lapping surface of a diamond lapping sheet define an angle of 60°.
Figure 42:
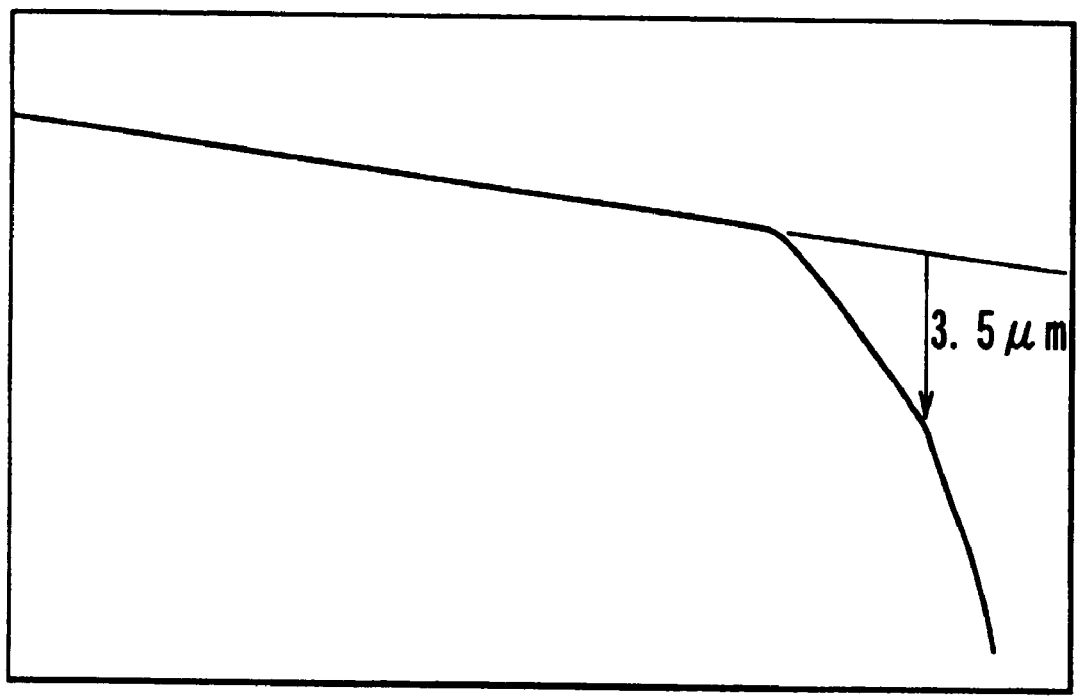
FIG. 42 illustrates an example of the shape of an edge after the second step of chamfering in the case shown in FIG. 41.
Figure 43:
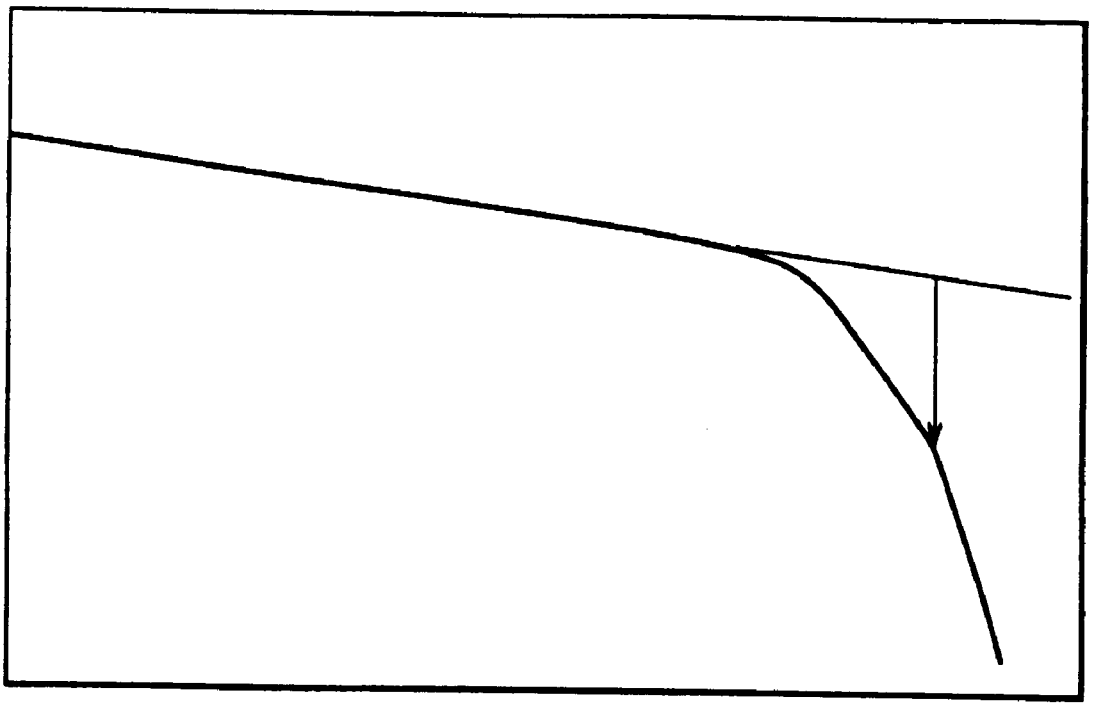
FIG. 43 illustrates an example of the shape of the edge after the third step of chamfering in the case shown in FIG. 41.

When the angle $\theta$ at the first and second steps of chamfering was 60° as shown in FIG. 41, an edge had a configuration, for example, as shown in FIG. 42 after the completion of the second step of chamfering and had a configuration, for example, as shown in FIG. 43 after the completion of the third step of chamfering.

Figure 44:
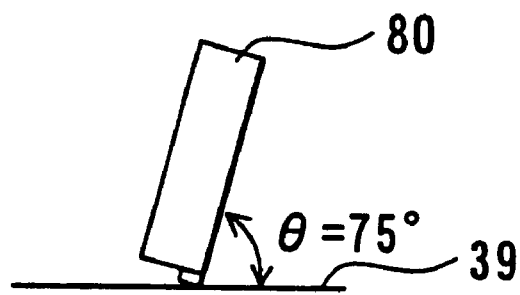
FIG. 44 illustrates a slider holding jig according to an embodiment of the invention wherein a lateral wall of the slider holding jig and a lapping surface of a diamond lapping sheet define an angle of 75°.
Figure 45:
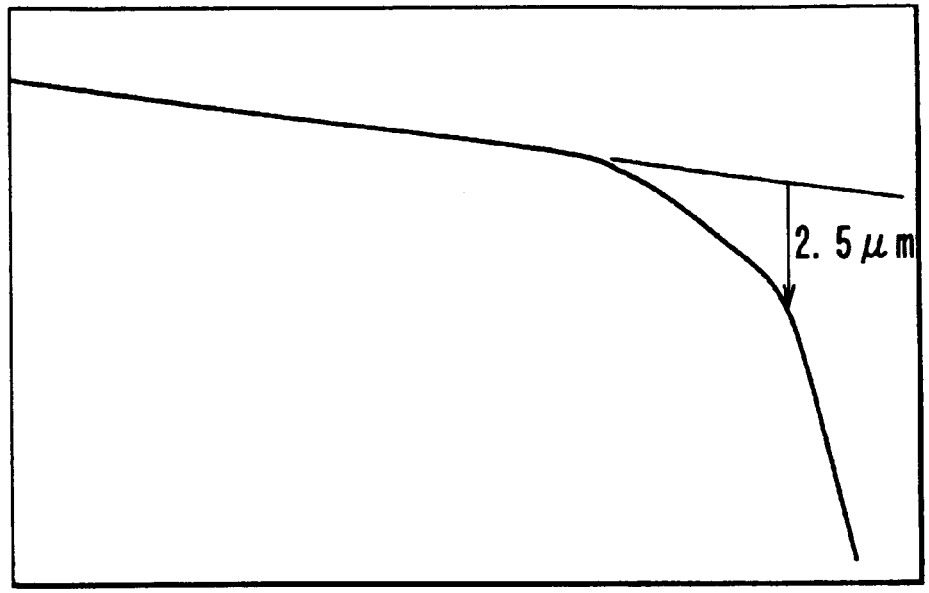
FIG. 45 illustrates an example of the shape of an edge after the second step of chamfering in the case shown in FIG. 44.
Figure 46:
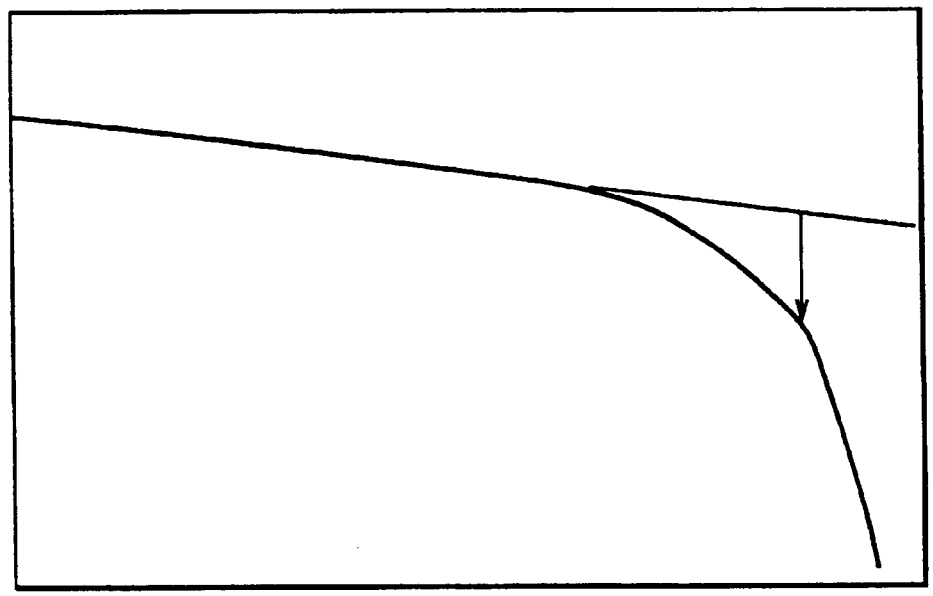
FIG. 46 illustrates an example of the shape of the edge after the third step of chamfering in the case shown in FIG. 44.
Figure 47:
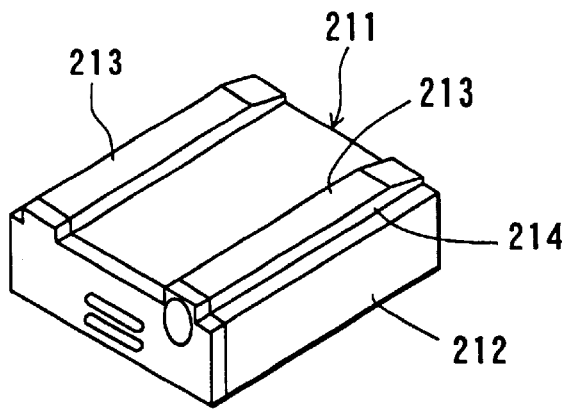
FIG. 47 is a perspective view showing an example of a configuration of a slider.
Figure 48:
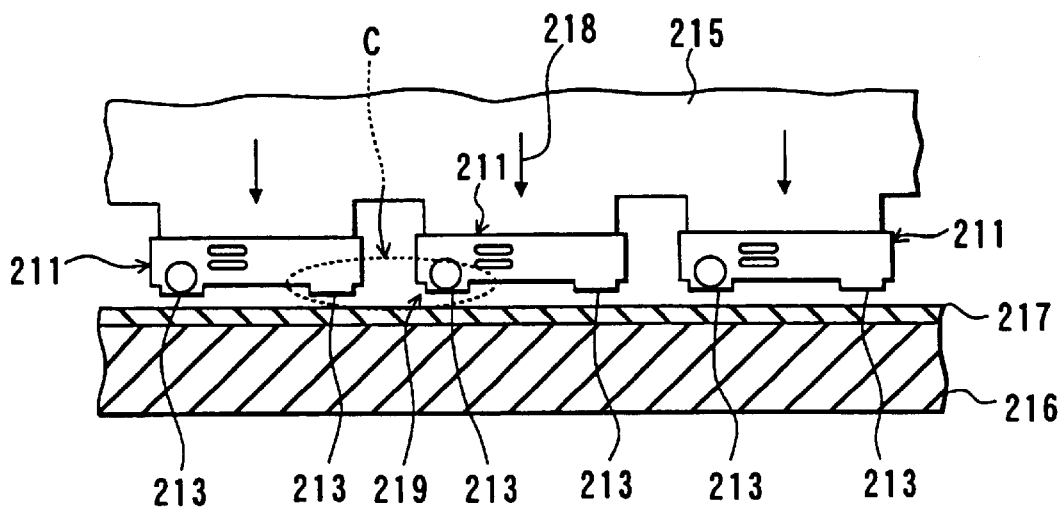
FIG. 48 schematically illustrates a method for chamfering a slider according to the related art.
Figure 49:
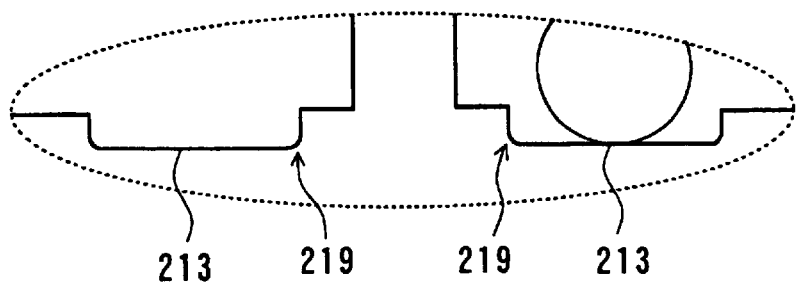
FIG. 49 is an enlarged illustration of a region C in the vicinity of edges of rail portions which have been chamfered according to the method shown in FIG. 48.
Figure 50:
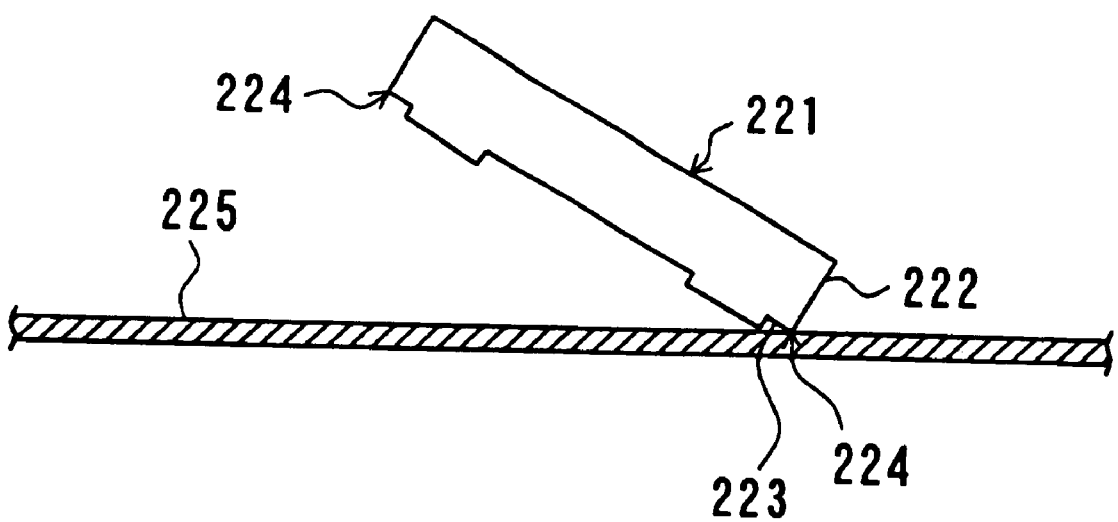
FIG. 50 illustrates a mode of inclination of a slider.

When the angle $\theta$ at the first and second steps of chamfering was 75° as shown in FIG. 44, an edge had a configuration, for example, as shown in FIG. 45 after the completion of the second step of chamfering and had a configuration, for example, as shown in FIG. 46 after the completion of the third step of chamfering.

The configurations shown in FIGS. 42, 43, 45 and 46 were measured in the same method as that used for FIGS. 39 and 40.

In the configuration shown in FIG. 42, the length of the chamfered region in the direction of the height thereof was 3.5 $\mu$m. In the configuration shown in FIG. 45, the length of the chamfered region in the direction of the height thereof was 2.5 $\mu$m. Those figures also indicate that the length of the chamfered region in the direction of the height becomes greater, the smaller the angle $\theta$.

However, it is assumed from a comparison between FIGS. 43 and 46 that a chamfered region keeps closeness to a slanting surface more significantly the smaller the angle $\theta$, even after the third step of chamfering. If it is assumed that the configuration shown in FIG. 43 represents the limit of an allowable range, the angle $\theta$ must be 60° or more.

As described above, the processing apparatus 10 and the method for processing a slider according to the present embodiment make it possible to chamfer the edges of the slider 150 on the side of the air inflow end thereof in a greater amount and to chamfer the first edges 161 and second edges 162 having steps. The present embodiment therefore makes it possible to provide a slider 150 for which damage of the surface of a recording medium caused by edges thereof can be prevented even if it is inclined.

Since a negative pressure slider is more likely to contact a recording medium at the first edges 161 when inclined compared to a slider which does not generate a negative pressure, the processing apparatus 10 and the method for processing a slider according to the present embodiment are significantly effective especially in processing a negative pressure slider.

The method for processing a slider according to the present embodiment makes it possible to sufficiently chamfer not only the edges of the slider 150 on the side of the air inflow end thereof, the first edges 161 and the second edges 162 but also other regions including the periphery of the surfaces to face a medium of the rail portions 153 and the periphery of the outer circumferential surfaces of the slider 150 close to the surfaces to face a medium. It is therefore possible to provide a slider 150 for which damage on a recording medium can be prevented even if the slider 150 is inclined in various ways.

In the processing apparatus 10 and the method for processing a slider according to the present embodiment, the diamond lapping sheet 39 is transformed to put it in contact with the first edges 161 and second edges 162 of the slider 150. Since the diamond lapping sheet 39 is held by the elastic rubber sheet 38 in doing so, it is possible to prevent the diamond lapping sheet 39 from being cut and to thereby perform stable processing of the slider 150.

According to the present embodiment, it is further possible to adjust the load applied to the slider holding jig 80 by loading the slider holding jig 80 with the plurality of weights 113, 123 and 133 in a stepwise manner. Therefore, the present embodiment makes it possible to prevent the thin diamond lapping sheet 39 from being cut by the edges of the slider 150.

Further, according to the present embodiment, the spiral grooves 138 or 139 are formed on at least either the shaft portions 113a, 123a and 133a of the weights 113, 123 and 133 or the holes of the weight holders 140. The grooves 138 or 139 collect chips (particles) generated by friction between the shaft portions 113a, 123a and 133a and the holes of the weight holders 140, thereby making it possible to maintain a stable operation of the shaft portions 113a, 123a and 133a.

According to the present embodiment, a slider holding jig setting plate 70A having holes 76A inclined at a predetermined angle relative to the vertical is prepared as one type of slider holding jig setting plate 70. The plate 70A positions the slider holding jig 80 such that the slider 150 is in contact with the diamond lapping sheet 39 with the surfaces of the slider to face a medium inclined relative to the lapping surface of the diamond lapping sheet 39. Therefore, according to the present embodiment, the use of the slider holding jig setting plate 70A makes it possible to chamfer specific edges of the slider 150, e.g., the edges of the slider 150 on the side of the air inflow end thereof, in a greater amount than other edges.

Further, according to the present embodiment, in order to chamfer the first edges 161 and second edges 162 having steps simultaneously, the rubber sheet 38 and diamond lapping sheet 39 are transformed by the wire 34. In the present embodiment, the wire 34 is stretched by splitting it into a plurality of segments using the plurality of wire winding blocks 30 instead of stretching it across the entire surface of the plate 18. As a result, the present embodiment makes it possible to stabilize the tension of the wire 34, thereby allowing an improvement of processing accuracy.

The present invention is not limited to the above-described embodiment and may be modified in various ways. For example, while the diamond lapping sheet 39 is moved by the X-Y table 13 with the slider 150 fixed in the embodiment, the slider 150 may alternatively be moved (swung) by moving the slider holding jig 80 with the diamond lapping sheet 39 fixed.

The invention is not limited to sliders having a configuration as shown in FIG. 24 and may be applied to sliders having other configurations. The present invention is not limited to sliders having a two-step structure and may be applied to processing of sliders having structures with three or more steps.

While the embodiment has referred to a negative pressure slider as an example of a slider to be processed, the invention may be applied to processing of sliders which generates no negative pressure.

The invention may be applied also to sliders intended for applications other than magnetic heads, e.g., a slider for a head (pick-up) for recording or reproducing information on an optical recording basis or photo-magnetic recording basis.

As described above, the first slider processing apparatus or the first load applying apparatus for processing a slider according to the invention allows adjustment of a load applied to the slider holder. This makes it possible to prevent edges of a slider from cutting the lapping member. According to the first method for processing a slider of the invention, a load applied to the slider holder for holding a slider is varied depending on the progress of chamfering on the slider, which makes it possible to prevent edges of the slider from cutting the lapping member.

The second slider processing apparatus or the second load applying apparatus for processing a slider according to the invention moves the weight holding portion for holding weights up and down to make it possible to apply a load to the slider holder for holding a slider only when necessary during lapping of edges of the slider to chamfer the edges, and a spiral groove is formed on at least either the outer circumferential surface of the shaft portion of the weight to apply a load to the slider holder or the inner circumferential surface of the hole of the weight holding portion. As a result, the spiral groove collects chips (particles) generated by friction between the shaft portion of the weight and the hole of the weight holding portion, which allows a smooth operation of the shaft portion to be maintained and consequently allows a smooth operation of the mechanism.

With the third slider processing apparatus or the second method for processing a slider according to the invention, the slider holder is positioned such that the slider is in contact with the lapping member with surfaces of the slider to face a medium inclined relative to the lapping surface of the lapping member to lap the edges of the slider. This makes it possible to chamfer a part of the edges of the slider in a greater amount than other edges.

The third method for processing a slider of the invention includes:
   a first lapping step for lapping a part of an edge of the slider in contact with the lapping member while moving the slider and the lapping member relative to each other in a state in which the slider is in contact with the lapping member with the surface of the slider to face a medium inclined relative to the lapping surface of the lapping member for lapping an edge of a slider; and
   a second lapping step for lapping a part of the edge of the slider in contact with the lapping member while moving the slider and the lapping member relative to each other in a state in which the slider is in contact with the lapping member with the surface of the slider to face a medium in parallel with the lapping surface of the lapping member. It is thus possible to lap a part of edges of a slider in a greater amount than other edges and to chamfer also the other edges sufficiently.

Since the first auxiliary device for processing a slider according to the invention makes it possible to position the slider holder such that a slider is in contact with the lapping member with a surface of the slider to face a medium inclined relative to the lapping surface of the lapping member, it is possible to lap a part of edges of a slider in a greater amount than other edges.

In the fourth slider processing apparatus or the second auxiliary device for processing a slider according to the invention, the wire for transforming the lapping member such that a plurality of edges having steps of a slider are simultaneously lapped is wound around the outer circumference of the main body. This stabilizes the tension of the wire, makes it possible to simultaneously lap a plurality of edges having steps of a slider to chamfer them and allows an improvement of processing accuracy.

It is apparent from the above description that the invention can be carried out in various modes and modifications. Therefore, the invention may be carried out in modes other than the above-described most preferable modes within the scope of equivalence of the appended claims.

What is claimed is:

1. A slider processing apparatus for lapping an edge of a slider having a surface to face a medium to chamfer the edge, comprising:
    a slider holder for holding a slider;
    a lapping member for lapping an edge of the slider held by said slider holder;
    load applying means for applying a load to the slider holder so as to urge the slider held by said slider holder against said lapping member, capable of adjusting the load applied to the slider holder; and
    moving means for moving the slider held by said slider holder and said lapping member relative to each other such that the edge of the slider is lapped by said lapping member.

2. A slider processing apparatus according to claim 1, wherein said lapping member is in the form of a sheet.

3. A slider processing apparatus according to claim 1, wherein said load applying means has:
    a plurality of weights for applying a load to the slider holder; and
    load adjusting means for adjusting the load by applying the load originating from said plurality of weights to the slider holder in a stepwise manner.

4. A slider processing apparatus according to claim 3, wherein
    said weights include a shaft portion and a large diameter portion greater in the diameter than said shaft portion;
    said load adjusting means includes weight holding portions in the form of a plurality of stages each formed with a hole which allows the shaft portion of said weight to pass therethrough and disallows said large diameter portion to pass therethrough for holding said weight movably in the axial direction of the shaft portion with said hole and includes weight holding portion moving means for moving said weight holding portion up and down; and
    said load adjusting means moves said weight holding portions downward with said weight holding portion moving means from a position in which the lower end of the shaft portion of the weight held by the weight holding portion at the bottom stage is located above the slider holder without contacting the slider holder to load the slider holder with the weights held by the weight holding portions in the form of a plurality of stages sequentially from the bottom stage.

5. A slider processing apparatus according to claim 3, wherein said weights comprise one or more blocks having a predetermined weight.

6. A slider processing apparatus according to claim 4, wherein a spiral groove is formed on at least either the outer circumferential surface of the shaft portions of said weights or the inner circumferential surface of the holes of said weight holding portions.

7. A slider processing apparatus according to claim 1, wherein said lapping member has a lapping surface, said processing apparatus further comprising a positioning device for positioning said slider holder such that a slider is put into contact with said lapping member in a state in which the surface of the slider to face a medium is inclined relative to the lapping surface of said lapping member.

8. A slider processing apparatus according to claim 7, wherein
    said slider includes a plurality of edges having steps; and
    said lapping member has flexibility,
        said processing apparatus further comprising transforming means for transforming said lapping member such that the plurality of edges having steps of the slider are simultaneously lapped by said lapping member.

9. A slider processing apparatus according to claim 1, wherein
    said slider includes a plurality of edges having steps; and
    said lapping member has flexibility,
        said processing apparatus further comprising a transforming device for transforming said lapping member such that the plurality of edges having steps of the slider are simultaneously lapped by said lapping member, having a main body provided in a position opposite to the slider held by said slider holder with said lapping member sandwiched therebetween and a wire wound around the outer circumference of said main body for transforming said lapping member.

10. A slider processing apparatus according to claim 9, wherein said transforming device further has an elastic member provided under a part of said wire located on the top surface of said transforming device.

11. A slider processing apparatus according to claim 9, wherein said transforming device further has a projection provided under a part of said wire located on the top surface of said transforming device.

12. A load applying apparatus for processing a slider, which is used for a slider processing apparatus for lapping an edge of a slider having a surface to face a medium to chamfer the edge, having a slider holder for holding a slider having a surface to face a medium, a lapping member for lapping an edge of the slider held by said slider holder and moving means for moving the slider held by said slider holder and said lapping member relative to each other so as to lap the edge of the slider with said lapping member, for applying a load to said slider holder so as to urge the slider held by said slider holder against said lapping member, said load applying apparatus comprising:
    a plurality of weights for applying a load to a slider holder; and
    load adjusting means for adjusting the load by applying the load originating from said plurality of weights to the slider holder in a stepwise manner,
        said weights including a shaft portion and a large diameter portion which is greater in the diameter than said shaft portion,
        said load adjusting means including weight holding portions in the form of a plurality of stages each formed with a hole which allows the shaft portion of said weight to pass therethrough and disallows said large diameter portion to pass therethrough for holding said weight movably in the axial direction of the shaft portion with said hole and including weight holding portion moving means for moving said weight holding portion up and down, said load adjusting means moving said weight holding portion downward with said weight holding portion moving means from a position in which the lower end of the shaft portion of the weight held by the weight holding portion at the bottom stage is located above the slider holder without contacting the slider holder to load the slider holder with the weights held by the weight holding portions in the form of a plurality of stages sequentially from the bottom stage.

13. A load applying apparatus for processing a slider according to claim 12, wherein said weights comprise one or more blocks having a predetermined weight.

14. A load applying apparatus for processing a slider according to claim 12, wherein a spiral groove is formed on at least either the outer circumferential surface of the shaft portions of said weights or the inner circumferential surface of the holes of said weight holding portions.

15. A slider processing apparatus for lapping an edge of a slider having a surface to face a medium to chamfer the edge, comprising:

a slider holder for holding a slider;

a lapping member for lapping an edge of the slider held by said slider holder;

load applying means for applying a load to the slider holder so as to urge the slider held by said slider holder against said lapping member; and moving means for moving the slider held by said slider holder and said lapping member relative to each other such that the edge of the slider is lapped by said lapping member, wherein said load applying means has:
  a weight including a shaft portion which can be put into contact with said slider holder at the lower end thereof and a large diameter portion greater in the diameter than said shaft portion;
  a weight holding portion formed with a hole which allows the shaft portion of said weight to pass therethrough and which disallows said large-diameter portion to pass therethrough for holding said weight movably in the axial direction of said shaft portion with said hole; and
  weight holding portion moving means for moving the weight holding portion up and down and wherein
    a spiral groove is formed on at least either the outer circumferential surface of the shaft portion of said weight or the inner circumferential surface of the hole of said weight holding portion.

16. A slider processing apparatus according to claim 15, wherein a plurality of said weight holding portions are provided in the form of stages to hold a plurality of weights; and said load applying means moves said weight holding portions downward with said weight holding portion moving means from a state in which the lower end of the weight held by the weight holding portion at the bottom stage is located above the slider holder without contacting the slider holder to load the slider holder with the weights held by the weight holding portions in the form of a plurality of stages sequentially from the bottom stage.

17. A slider processing apparatus according to claim 15, wherein said weights comprise one or more blocks having a predetermined weight.

18. A load applying apparatus for processing a slider, used for a slider processing apparatus for lapping an edge of a slider having a surface to face a medium to chamfer the edge, having a slider holder for holding a slider having a surface to face a medium, a lapping member for lapping an edge of the slider held by said slider holder and moving means for moving the slider held by said slider holder and said lapping member relative to each other so as to lap the edge of the slider with said lapping member, for applying a load to said slider holder so as to urge the slider held by said slider holder against said lapping member, said load applying apparatus comprising:

a weight including a shaft portion which can be put into contact with said slider holder at the lower end thereof and a large diameter portion greater in the diameter than said shaft portion;

a weight holding portion formed with a hole which allows the shaft portion of said weight to pass therethrough and which disallows said large-diameter portion to pass therethrough, for holding said weight movably in the axial direction of said shaft portion with said hole; and weight holing portion moving means for moving said weight holding portion up and down, wherein
  a spiral groove is formed on at least either the outer circumferential surface of the shaft portion of said weight or the inner circumferential surface of the hole of said weight holding portion.

19. A load applying apparatus for processing a slider according to claim 18, said weight comprises one or more blocks having a predetermined weight.

20. A slider processing apparatus for lapping edges of a slider having a surface to face a medium to chamfer the edges, comprising:

a slider holder for holding a slider;

a lapping member having a lapping surface for lapping an edge of the slider held by said slider holder;

a positioning device for positioning said slider holder such that the slider contacts the lapping member with a surface of the slider to face a medium inclined relative to the lapping surface of said lapping member; and moving means for moving the slider held by said slider holder and said lapping member relative to each other such that the edge of the slider is lapped by said lapping member.

21. A slider processing apparatus according to claim 20, wherein said slider includes a plurality of edges having steps; and said lapping member has flexibility, said processing apparatus further comprising transforming means for transforming said lapping member such that the plurality of edges having steps of the slider are simultaneously lapped by said lapping member.

22. An auxiliary device for processing a slider, which is used for a slider processing apparatus for lapping an edge of a slider having a surface to face a medium to chamfer the edge, having a slider holder for holding a slider having a surface to face a medium, a lapping member for lapping an edge of the slider held by said slider holder and moving means for moving the slider held by said slider holder and said lapping member relative to each other so as to lap the edge of the slider with said lapping member, for positioning said slider holder relative to said lapping member, said auxiliary device comprising:

a main body located above said lapping member; and a positioning portion formed on said main body for positioning said slider holder such that a slider is put into contact with the lapping member with a surface of the slider to face a medium inclined relative to the lapping surface of said lapping member.

23. A slider processing apparatus for lapping edges of a slider including a plurality of edges having steps and a surface to face a medium to chamfer the edges, comprising:

a slider holder for holding a slider;

a flexible lapping member for lapping edges of the slider held by said slider holder;

a transforming device for transforming said lapping member such that the plurality of edges having steps of the slider are simultaneously lapped by said lapping member, having a main body located opposite to the slider held by said slider holder with said lapping member sandwiched therebetween and a wire wound around the outer circumference of said main body for transforming said lapping member; and moving means for moving the slider held by said slider holder and said lapping member relative to each other such that the edges of the slider is lapped by said lapping member.

24. A slider processing apparatus according to claim 23, wherein said transforming device further has an elastic member provided under a part of said wire located on the upper surface of said transforming device.

25. A slider processing apparatus according to claim 23, wherein said transforming device further has a projection provided under a part of said wire located on the upper surface of said transforming device.

26. An auxiliary device used for a slider processing apparatus for lapping edges of a slider having a surface to face a medium to chamfer the edges, having a slider holder for holding a slider having a plurality of edges having steps and a surface to face a medium, a flexible lapping member for lapping the edges of the slider held by said slider holder and moving means for moving the slider held by said slider holder and said lapping member relative to each other so as to lap the edges of the slider with said lapping member, comprising:

a main body located in a position opposite to a slider held by said slider holder with said lapping member sandwiched therebetween; and a wire wound around the outer circumference of said main body for transforming said lapping member such that a plurality of edges having steps of the slider are simultaneously lapped by said lapping member.

27. An auxiliary device for processing a slider according to claim 26, further comprising an elastic member provided under a part of said wire located on the upper surface of said auxiliary device for processing a slider.

28. An auxiliary device for processing a slider according to claim 26, further comprising a projection provided under a part of said wire located on the upper surface of said auxiliary device for processing a slider.

29. A slider processing apparatus for lapping an edge of a slider having a surface to face a medium to chamfer the edge, comprising:

a slider holder for holding a slider;

a lapping member for lapping an edge of the slider held by said slider holder;

a load applying apparatus for applying a load to the slider holder so as to urge the slider held by said slider holder against said lapping member, capable of adjusting the load applied to the slider holder; and a moving device for moving the slider held by said slider holder and said lapping member relative to each other such that the edge of the slider is lapped by said lapping member.

30. A slider processing apparatus according to claim 29, wherein said lapping member is in the form of a sheet.

31. A slider processing apparatus according to claim 29, wherein said load applying apparatus has:

a plurality of weights for applying a load to the slider holder; and a load adjusting device for adjusting the load by applying the load originating from said plurality of weights to the slider holder in a stepwise manner.

32. A slider processing apparatus according to claim 31, wherein said weights include a shaft portion and a large diameter portion greater in the diameter than said shaft portion;

said load adjusting device includes weight holding portions in the form of a plurality of stages each formed with a hole which allows the shaft portion of said weight to pass therethrough and disallows said large diameter portion to pass therethrough for holding said weight movably in the axial direction of the shaft portion with said hole and includes a weight holding portion moving device for moving said weight holding portion up and down; and said load adjusting device moves said weight holding portions downward with said weight holding portion moving device from a position in which the lower end of the shaft portion of the weight held by the weight holding portion at the bottom stage is located above the slider holder without contacting the slider holder to load the slider holder with the weights held by the weight holding portions in the form of a plurality of stages sequentially from the bottom stage.

33. A slider processing apparatus according to claim 32, wherein a spiral groove is formed on at least either the outer circumferential surface of the shaft portions of said weights or the inner circumferential surface of the holes of said weight holding portions.

34. A slider processing apparatus according to claim 31, wherein said weights comprise one or more blocks having a predetermined weight.

35. A slider processing apparatus according to claim 29, wherein said lapping member has a lapping surface, said processing apparatus further comprising a positioning device for positioning said slider holder such that a slider is put into contact with said lapping member in a state in which the surface of the slider to face a medium is inclined relative to the lapping surface of said lapping member.

36. A slider processing apparatus according to claim 35, wherein said slider includes a plurality of edges having steps; and said lapping member has flexibility, said processing apparatus further comprising a transforming device for transforming said lapping member such that the plurality of edges having steps of the slider are simultaneously lapped by said lapping member.

37. A slider processing apparatus according to claim 29, wherein said slider includes a plurality of edges having steps; and said lapping member has flexibility,
said processing apparatus further comprising a transforming device for transforming said lapping member such that the plurality of edges having steps of the slider are simultaneously lapped by said lapping member, having a main body provided in a position opposite to the slider held by said slider holder with said lapping member sandwiched therebetween and a wire wound around the outer circumference of said main body for transforming said lapping member.

38. A slider processing apparatus according to claim 37, wherein said transforming device further has an elastic member provided under a part of said wire located on the top surface of said transforming device.

39. A slider processing apparatus according to claim 37, wherein said transforming device further has a projection provided under a part of said wire located on the top surface of said transforming device.

40. A load applying apparatus for processing a slider, which is used for a slider processing apparatus for lapping an edge of a slider having a surface to face a medium to chamfer the edge, having a slider holder for holding a slider having a surface to face a medium, a lapping member for lapping an edge of the slider held by said slider holder and a moving device for moving the slider held by said slider holder and said lapping member relative to each other so as to lap the edge of the slider with said lapping member, for applying a load to said slider holder so as to urge the slider held by said slider holder against said lapping member, said load applying apparatus comprising:
a plurality of weights for applying a load to a slider holder; and
a load adjusting device for adjusting the load by applying the load originating from said plurality of weights to the slider holder in a stepwise manner,
said weights including a shaft portion and a large diameter portion which is greater in the diameter than said shaft portion,
said load adjusting device including weight holding portions in the form of a plurality of stages each formed with a hole which allows the shaft portion of said weight to pass therethrough and disallows said large diameter portion to pass therethrough for holding said weight movably in the axial direction of the shaft portion with said hole and including a weight holding portion moving device for moving said weight holding portion up and down,
said load adjusting device moving said weight holding portion downward with said weight holding portion moving device from a position in which the lower end of the shaft portion of the weight held by the weight holding portion at the bottom stage is located above the slider holder without contacting the slider holder to load the slider holder with the weights held by the weight holding portions in the form of a plurality of stages sequentially from the bottom stage.

41. A load applying apparatus for processing a slider according to claim 40, wherein said weights comprise one or more blocks having a predetermined weight.

42. A load applying apparatus for processing a slider according to claim 40, wherein a spiral groove is formed on at least either the outer circumferential surface of the shaft portions of said weights or the inner circumferential surface of the holes of said weight holding portions.

43. A slider processing apparatus according for lapping an edge of a slider having a surface to face a medium to chamfer the edge, comprising:
a slider holder for holding a slider;
a lapping member for lapping an edge of the slider held by said slider holder;
a load applying device for applying a load to the slider holder so as to urge the slider held by said slider holder against said lapping member; and
a moving device for moving the slider held by said slider holder and said lapping member relative to each other such that the edge of the slider is lapped by said lapping member, wherein
said load applying device has:
a weight including a shaft portion which can be put into contact with said slider holder at the lower end thereof and a large diameter portion greater in the diameter than said shaft portion;
a weight holding portion formed with a hole which allows the shaft portion of said weight to pass therethrough and which disallows said large-diameter portion to pass therethrough for holding said weight movably in the axial direction of said shaft portion with said hole; and
a weight holing portion moving device for moving the weight holding portion up and down and wherein
a spiral groove is formed on at least either the outer circumferential surface of the shaft portion of said weight or the inner circumferential surface of the hole of said weight holding portion.

44. A slider processing apparatus according to claim 43, wherein
a plurality of said weight holding portions are provided in the form of stages to hold a plurality of weights; and
said load applying device moves said weight holding portions downward with said weight holding portion moving device from a state in which the lower end of the weight held by the weight holding portion at the bottom stage is located above the slider holder without contacting the slider holder to load the slider holder with the weights held by the weight holding portions in the form of a plurality of stages sequentially from the bottom stage.

45. A slider processing apparatus according to claim 43, wherein said weights comprise one or more blocks having a predetermined weight.

46. A load applying apparatus for processing a slider, used for a slider processing apparatus for lapping an edge of a slider having a surface to face a medium to chamfer the edge, having a slider holder for holding a slider having a surface to face a medium, a lapping member for lapping an edge of the slider held by said slider holder and a moving device for moving the slider held by said slider holder and said lapping member relative to each other so as to lap the edge of the slider with said lapping member, for applying a load to said slider holder so as to urge the slider held by said slider holder against said lapping member, said load applying apparatus comprising:
a weight including a shaft portion which can be put into contact with said slider holder at the lower end thereof and a large diameter portion greater in the diameter than said shaft portion;
a weight holding portion formed with a hole which allows the shaft portion of said weight to pass therethrough and which disallows said large-diameter portion to pass therethrough, for holding said weight movably in the axial direction of said shaft portion with said hole; and a weight holing portion moving device for moving said weight holding portion up and down, wherein
a spiral groove is formed on at least either the outer circumferential surface of the shaft portion of said weight or the inner circumferential surface of the hole of said weight holding portion.

47. A load applying apparatus for processing a slider according to claim 46, said weight comprises one or more blocks having a predetermined weight.

48. A slider processing apparatus for lapping edges of a slider having a surface to face a medium to chamfer the edges, comprising:
a slider holder for holding a slider;
a lapping member having a lapping surface for lapping an edge of the slider held by said slider holder;
a positioning device for positioning said slider holder such that the slider contacts the lapping member with a surface of the slider to face a medium inclined relative to the lapping surface of said lapping member; and
a moving device for moving the slider held by said slider holder and said lapping member relative to each other such that the edge of the slider is lapped by said lapping member.

49. A slider processing apparatus according to claim 48, wherein
said slider includes a plurality of edges having steps; and
said lapping member has flexibility, said processing apparatus further comprising a transforming device for transforming said lapping member such that the plurality of edges having steps of the slider are simultaneously lapped by said lapping member.

50. A slider processing apparatus for lapping edges of a slider including a plurality of edges having steps and a surface to face a medium to chamfer the edges, comprising:
a slider holder for holding a slider;
a flexible lapping member for lapping edges of the slider held by said slider holder;
a transforming device for transforming said lapping member such that the plurality of edges having steps of the slider are simultaneously lapped by said lapping member, having a main body located opposite to the slider held by said slider holder with said lapping member sandwiched therebetween and a wire wound around the outer circumference of said main body for transforming said lapping member; and
a moving device for moving the slider held by said slider holder and said lapping member relative to each other such that the edges of the slider is lapped by said lapping member.

51. A slider processing apparatus according to claim 50, wherein said transforming device further has an elastic member provided under a part of said wire located on the upper surface of said transforming device.

52. A slider processing apparatus according to claim 50, wherein said transforming device further has a projection provided under a part of said wire located on the upper surface of said transforming device.

* * * * *

UNITED STATES PATENT AND TRADEMARK OFFICE
CERTIFICATE OF CORRECTION

PATENT NO.      : 6,361,399 B2                                     Page 1 of 1
DATED           : March 26, 2002
INVENTOR(S)     : Kanji Kobayashi et al.

It is certified that error appears in the above-identified patent and that said Letters Patent is hereby corrected as shown below:

Column 10,
Line 54, after "FIG.", insert -- 1, --.

Column 11,
Line 62, replace "FIGS." with -- FIG. --.

Column 27,
Line 64, replace "FIGS." with -- FIG. --.

Signed and Sealed this

Eighteenth Day of June, 2002

*Attest:*

*Attesting Officer*

JAMES E. ROGAN
*Director of the United States Patent and Trademark Office*